United States Patent
Shelby et al.

(10) Patent No.: US 8,389,117 B2
(45) Date of Patent: Mar. 5, 2013

(54) HOT MELT ADHESIVES FOR ROLL-APPLIED LABELS

(75) Inventors: Marcus David Shelby, Fall Branch, TN (US); Scott Ellery George, Kingsport, TN (US); Gary Robert Robe, Kingsport, TN (US); Freddie Wayne Williams, Kingsport, TN (US); Michael Eugene Donelson, Kingsport, TN (US); Joshua Seth Cannon, Greeneville, TN (US); Emmett Patrick O'Brien, Johnson City, TN (US); Jeremy Richard Lizotte, Gray, TN (US); Anthony Joseph Pasquale, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 481 days.

(21) Appl. No.: 12/577,324

(22) Filed: Oct. 12, 2009

(65) Prior Publication Data
US 2010/0112250 A1   May 6, 2010

Related U.S. Application Data

(60) Provisional application No. 61/109,545, filed on Oct. 30, 2008.

(51) Int. Cl.
*C08L 9/00* (2006.01)

(52) U.S. Cl. ............... 428/346; 428/355 R; 428/343; 428/481; 428/480; 428/349; 428/540; 524/270; 524/603; 528/302

(58) Field of Classification Search ............... 428/35.7, 428/343, 355 R, 346, 481, 480, 349, 540, 428/309; 528/302, 308; 524/270, 603
See application file for complete search history.

(56) References Cited

U.S. PATENT DOCUMENTS

| | | | |
|---|---|---|---|
| 4,122,073 A | 10/1978 | Georgoudis | |
| 4,291,153 A | 9/1981 | Noonan et al. | |
| 4,307,174 A | 12/1981 | Noonan et al. | |
| 4,340,526 A | 7/1982 | Petke et al. | |
| 4,363,853 A | 12/1982 | Imamura et al. | |
| 4,419,507 A * | 12/1983 | Sublett ............ | 528/302 |
| 4,844,760 A | 7/1989 | Dickey | |
| 4,923,557 A | 5/1990 | Dickey | |
| 4,956,963 A | 9/1990 | Johnson | |
| 4,961,797 A | 10/1990 | Doheny | |
| 4,983,238 A | 1/1991 | Yoshida et al. | |
| 4,996,283 A | 2/1991 | Greco et al. | |
| 5,045,140 A | 9/1991 | Dickey | |
| 5,047,107 A | 9/1991 | Keller et al. | |
| 5,091,239 A | 2/1992 | Przeworski et al. | |
| 5,091,454 A | 2/1992 | Arendt | |
| 5,097,006 A | 3/1992 | Kapilow | |
| 5,153,064 A | 10/1992 | Hefele | |
| 5,252,155 A | 10/1993 | Nowicki | |
| 5,281,647 A | 1/1994 | Eapen | |
| 5,321,933 A | 6/1994 | Seifert et al. | |
| 5,376,460 A | 12/1994 | Hardeman | |
| 5,401,796 A | 3/1995 | Kashima | |
| 5,436,314 A | 7/1995 | Yang et al. | |
| 5,439,541 A | 8/1995 | Economy | |
| 5,439,988 A | 8/1995 | Moens | |
| 5,443,668 A | 8/1995 | Zaborney et al. | |
| 5,445,778 A | 8/1995 | Ihm et al. | |
| 5,484,842 A | 1/1996 | Lewarchik et al. | |
| 5,486,253 A | 1/1996 | Otruba | |
| 5,504,148 A | 4/1996 | Iwaya et al. | |
| 5,522,960 A | 6/1996 | Rello et al. | |
| 5,538,575 A | 7/1996 | Hinton | |
| 5,559,171 A | 9/1996 | Buchanan et al. | |
| 5,608,031 A | 3/1997 | Yau et al. | |
| 5,616,681 A | 4/1997 | Itoh et al. | |
| 5,624,986 A | 4/1997 | Bunnelle et al. | |
| 5,627,229 A | 5/1997 | Bunnelle et al. | |
| 5,628,847 A | 5/1997 | Sowden | |
| 5,650,481 A | 7/1997 | Yau et al. | |
| 5,654,380 A | 8/1997 | Kawai et al. | |
| 5,668,243 A | 9/1997 | Yau et al. | |
| 5,696,225 A | 12/1997 | Cai et al. | |
| 5,711,836 A | 1/1998 | Hill | |

(Continued)

FOREIGN PATENT DOCUMENTS

| | | |
|---|---|---|
| EP | 1046691 A2 | 10/2000 |
| EP | 2045305 A1 | 4/2009 |
| JP | 57012081 A | 1/1982 |
| JP | 2005008672 A | 1/2005 |
| KR | 20010016861 A | 3/2001 |

OTHER PUBLICATIONS

Copending U.S. Appl. No. 12/577,333, filed Oct. 12, 2009.
International Search Report for PCT/US2009/005761 dated Jan. 29, 2010.
USPTO Office Action dated Nov. 18, 2011 in copending U.S. Appl. No. 12/577,333.
USPTO Office Action dated Apr. 25, 2012 in copending U.S. Appl. No. 12/577,333.

*Primary Examiner* — Ellen S Wood
(74) *Attorney, Agent, or Firm* — Polly C. Owen; Jennifer R. Knight; Eric Middlemas

(57) ABSTRACT

Disclosed are hot-melt adhesives prepared from polyesters containing 1,4-cyclohexane-dicarboxylic acid as a diacid component and a diol component containing at least two diols chosen from 1,4-cyclohexanedimethanol, triethylene glycol, and diethylene glycol. These adhesives set up rapidly within a well-defined temperature window. The hot-melt adhesives can be used in a variety of applications, but are especially suited as seaming adhesives for roll-applied labels. These adhesives have melting temperatures and crystallization properties that allow their application at temperatures cool enough to prevent curling and premature shrinkage of the shrink label during seaming, and yet produce strong label seams that can withstand the elevated temperatures of a shrink tunnel without sacrificing line speed. Also disclosed are labeled containers and a process for applying a roll-on, shrink label to a container using the hot-melt adhesives of the invention.

12 Claims, No Drawings

U.S. PATENT DOCUMENTS

| | | |
|---|---|---|
| 5,714,569 A | 2/1998 | Takiyama et al. |
| 5,720,834 A | 2/1998 | Steele et al. |
| 5,721,336 A | 2/1998 | Umland |
| 5,736,622 A | 4/1998 | Wallberg et al. |
| 5,744,538 A | 4/1998 | Miller et al. |
| 5,750,635 A | 5/1998 | Brink et al. |
| 5,859,152 A | 1/1999 | Miller et al. |
| 5,897,722 A | 4/1999 | Bright |
| 5,922,158 A | 7/1999 | Culp et al. |
| 5,928,460 A | 7/1999 | Miller et al. |
| 5,932,344 A | 8/1999 | Ikemoto et al. |
| 5,964,974 A | 10/1999 | Hinton |
| 6,007,910 A | 12/1999 | Miller et al. |
| 6,068,910 A | 5/2000 | Flynn et al. |
| 6,086,697 A | 7/2000 | Key |
| 6,114,033 A | 9/2000 | Ikemoto et al. |
| 6,255,443 B1 | 7/2001 | Kinkelin et al. |
| 6,270,866 B1 | 8/2001 | Okuda et al. |
| 6,325,879 B1 | 12/2001 | Heckman et al. |
| 6,342,304 B1 | 1/2002 | Buchanan et al. |
| 6,348,679 B1 | 2/2002 | Ryan et al. |
| 6,410,627 B1 | 6/2002 | Paul et al. |
| 6,448,463 B1 | 9/2002 | Fischer et al. |
| 6,497,950 B1 | 12/2002 | Haile et al. |
| 6,582,818 B2 | 6/2003 | Haile et al. |
| 7,048,978 B2 | 5/2006 | Tanaka et al. |
| 7,235,623 B2 | 6/2007 | Strand et al. |
| 7,314,902 B2 | 1/2008 | Ton-That et al. |
| 7,427,332 B2 | 9/2008 | Takemoto et al. |
| 2006/0074214 A1 | 4/2006 | Kesselmayer et al. |
| 2007/0281235 A1 | 12/2007 | Ono et al. |

\* cited by examiner

HOT MELT ADHESIVES FOR ROLL-APPLIED LABELS

CROSS-REFERENCES TO RELATED APPLICATIONS

This application claims the benefit of U.S. Provisional Application Ser. No. 61/109,545, filed Oct. 30, 2008.

FIELD OF THE INVENTION

This invention pertains to hot melt adhesives. More specifically, this invention pertains to hot-melt adhesives that comprise at least 50 weight percent of a low molecular weight polyester comprising the residues of 1,4-cyclohexanedicarboxylic acid; at least two diols chosen from 1,4-cyclohexanedimethanol, triethylene glycol, and diethylene glycol; and optionally a tackifier, plasticizer, wax, or a nucleator. These adhesives can be used for multiple applications but are particularly useful for roll-applied shrink labels.

BACKGROUND OF THE INVENTION

Traditional, non-shrink labels frequently are prepared from paper, foil, polypropylene film, and the like, and are applied to a container by way of a "roll-fed" process in which the label is simultaneously wrapped around and glued to the container. The adhesive is typically a hot melt adhesive such as, for example, a styrenic block copolymer or ethylene vinyl acetate, which is applied both to the label seam to adhere the label to itself ("seaming") and to the container to hold the label in place.

Hot melt adhesives are thermoplastic materials which are solid at room temperature. When heated to a liquid or molten form, the hot melt adhesive can be applied to one or more surfaces that are joined together as the hot melt adhesive cools back to a solid. There are no special requirements for the adhesive for non-shrink labels, other than providing enough strength to hold the label in place during typical handling procedures. In addition, because non-shrink labels are dimensionally stable (i.e., do not shrink), the adhesive can be applied over a wide range of temperatures without risk of prematurely shrinking or curling the label seam.

The adhesives used for non-shrink labels generally are not satisfactory for shrink labels, however. Because shrink labels deform when heated above their "shrink onset" temperature (i.e., the temperature at which shrinkage occurs), the adhesive must be applied at a temperature that will avoid premature curling and shrinking of the label. Further, after a shrink label is seamed, it must pass through a heat tunnel in order to shrink the label onto the underlying container. In the shrink tunnel, the adhesive must be able to withstand elevated temperatures and the force from the shrink label, which will tend to pull the label seam apart. Hence, the adhesive seam for a shrink label typically will have greater strength than a seam in a non-shrink label, and should be able to maintain this strength at the elevated temperatures of a shrink tunnel.

The hot melt adhesives that are used now with roll-on shrink-on labels are limited to applications involving low shrinkage films (e.g., having 15% shrinkage or less), such as, for example, labels prepared from a polypropylene substrate. Because these films have low shrink force and shrinkage, separation of the seam and curling of the label do not occur.

By contrast, labels prepared from other polymers such as, for example, polyesters, polystyrene, poly(vinyl chloride), and poly(lactic acid), can have much greater shrinkage and shrink forces than materials that are now being used for roll-applied, shrink-on applications. For example, labels prepared from polyester polymers can have 20 to 80% shrinkage. This high shrinkage enables the shrink label to tightly fit against highly contoured containers and results in a more aesthetically pleasing package. New hot melt adhesives are needed for roll-applied shrink labels that provide sufficient bond strength to withstand high shrink forces and elevated temperatures and can be applied at a temperature that does not cause premature shrinkage or curling of the film.

SUMMARY OF THE INVENTION

We have discovered hot-melt adhesive compositions comprising at least 50 weight percent of a polyester that can be applied at temperatures below the shrink onset temperature of high shrinkage films and can withstand high shrink forces at the elevated temperatures commonly used in shrink tunnels. Thus, in one embodiment, our invention provides a hot-melt adhesive composition, comprising:

A. about 50 to 100 weight percent, based on the total weight of the adhesive composition, of at least one polyester, comprising (i) diacid residues, comprising about 70 to 100 mole percent, based on the total moles of diacid residues, of the residues of 1,4-cyclohexanedicarboxylic acid, and 0 to about 30 mole percent of the residues of at least one modifying dicarboxylic acid having about 4 to about 40 carbon atoms; and (ii) diol residues, comprising about 70 to about 100 mole percent, based on the total moles of diol residues, of the residues of at least two diols chosen from 1,4-cyclohexanedimethanol, triethylene glycol, and diethylene glycol; and about 30 to about 0 mole percent of the residues of at least one modifying diol; and B. 0 to about 50 weight percent of a tackifier, plasticizer, wax, nucleator, or combination thereof;

wherein the polyester has an inherent viscosity of about 0.1 to about 0.4 dL/g as measured at 25° C. using 0.5 grams of polymer per 100 ml of a solvent comprising 60 weight percent phenol and 40 weight % tetrachloroethane, a melting temperature of about 80 to about 130° C., and a heat of melting of about 0.1 cal/g to about 6 cal/g; and wherein the adhesive composition has a melt viscosity of about 300 to about 3000 centipoise at 150° C.

The hot melt adhesives of the present invention can be used in a wide variety of applications, particularly those requiring a rapid crystallization time within a controlled temperature window. Our hot-melt adhesive can be applied as a liquid and provides excellent bond strength at temperatures above the initial application temperature. This characteristic is of particular benefit when bonding substrates that are thermally sensitive and/or thermally activated such as, for example, roll-applied shrink labels having a high degree of shrinkage.

Our adhesive composition is useful for attaching roll-applied shrink labels to containers. Another embodiment of the invention, therefore, is a container comprising a label adhered thereto with a hot-melt adhesive composition, comprising A. about 50 to 100 weight percent, based on the total weight of the adhesive composition, of at least one polyester, comprising (i) diacid residues, comprising about 70 to 100 mole percent, based on the total moles of diacid residues, of the residues of 1,4-cyclohexanedicarboxylic acid, and 0 to about 30 mole percent of the residues of at least one modifying dicarboxylic acid having about 4 to about 40 carbon atoms; and (ii) diol residues, comprising about 70 to about 100 mole percent, based on the total moles of diol residues, of the residues of at least two diols chosen from 1,4-cyclohexanedimethanol, triethylene glycol, and diethylene glycol, and about 30 to about 0 mole percent of the residues of at least one modifying diol; and B. 0 to about 50 weight percent of a tackifier, plasticizer, wax, nucleator, or combination thereof;

wherein the polyester has an inherent viscosity of about 0.1 to about 0.4 dL/g as measured at 25° C. using 0.5 grams of polymer per 100 ml of a solvent comprising 60 weight percent phenol and 40 weight % tetrachloroethane, a melting temperature of about 80 to about 130° C., and a heat of melting of about 0.1 cal/g to about 6 cal/g, and wherein the adhesive composition has a melt viscosity of about 300 to about 3000 centipoise at 150° C.

Our invention also provides a process for applying a roll-on, shrink label to a container, comprising:

I. applying a hot-melt adhesive to one or more locations on a heat-shrinkable label, a container, or a combination thereof, wherein the hot-melt adhesive comprises A. about 50 to 100 weight percent, based on the total weight of the adhesive composition, of at least one polyester, comprising (i) diacid residues, comprising about 70 to 100 mole percent, based on the total moles of diacid residues, of the residues of 1,4-cyclohexanedicarboxylic acid, and 0 to about 30 mole percent of the residues of at least one modifying dicarboxylic acid having about 4 to about 40 carbon atoms; and (ii) diol residues, comprising about 70 to about 100 mole percent, based on the total moles of diol residues, of the residues of at least two diols chosen from 1,4-cyclohexanedimethanol, triethylene glycol, and diethylene glycol, and about 30 to about 0 mole percent of the residues of at least one modifying diol; and B. 0 to about 50 weight percent of a tackifier; plasticizer, wax, nucleator, or combination thereof;

wherein the polyester has an inherent viscosity of about 0.1 to about 0.4 dL/g as measured at 25° C. using 0.5 grams of polymer per 100 ml of a solvent comprising 60 weight percent phenol and 40 weight % tetrachloroethane, a melting temperature of about 80 to about 130° C., and a heat of melting of about 0.1 cal/g to about 6 cal/g; and wherein the adhesive composition has a melt viscosity of about 300 to about 3000 centipoise at 150° C.;

II. affixing the label around the container to produce a labeled container;

III. allowing the applied hot-melt adhesive to at least partially crystallize; and IV. shrinking the label by exposing the labeled container to heat.

DETAILED DESCRIPTION

The hot-melt adhesive composition of the invention comprises at least 50 weight percent of a polyester and is particularly useful for roll-applied shrink labels in which the films exhibit high shrinkage (e.g., about 25-75%) and shrink force. In a general embodiment, our hot-melt adhesive composition comprises:

A. about 50 to 100 weight percent, based on the total weight of the adhesive composition, of at least one polyester, comprising (i) diacid residues, comprising about 70 to 100 mole percent, based on the total moles of diacid residues, of the residues of 1,4-cyclohexanedicarboxylic acid, and 0 to about 30 mole percent of the residues of at least one modifying dicarboxylic acid having about 4 to about 40 carbon atoms; and (ii) diol residues, comprising about 70 to about 100 mole percent, based on the total moles of diol residues, of the residues of at least two diols chosen from 1,4-cyclohexanedimethanol, triethylene glycol, and diethylene glycol, and about 30 to about 0 mole percent of the residues of at least one modifying diol; and B. 0 to about 50 weight percent of a tackifier, plasticizer, wax, nucleator, or combination thereof;

wherein the polyester has an inherent viscosity of about 0.1 to about 0.4 dL/g as measured at 25° C. using 0.5 grams of polymer per 100 ml of a solvent comprising 60 weight percent phenol and 40 weight % tetrachloroethane, a melting temperature of about 80 to about 130° C., and a heat of melting of about 0.1 cal/g to about 6 cal/g; and wherein the adhesive composition has a melt viscosity of about 300 to about 3000 centipoise at 150° C.

The hot melt adhesive of the present invention can be used in a wide variety of applications, particularly those requiring rapid crystallization and high bond strength at temperatures above the initial application temperature. The hot-melt adhesives of the invention are useful for polyester, roll-applied shrink labels.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps may be arranged in any sequence.

The hot-melt adhesive of the present invention comprises a thermoplastic polyester. The term "polyester", as used herein, is intended to include "copolyesters" and is understood to mean a synthetic polymer prepared by the polyesterification and polycondensation of one or more difunctional carboxylic acids with one or more difunctional hydroxyl compounds. Typically the difunctional carboxylic acid is a dicarboxylic acid and the difunctional hydroxyl compound is a dihydric alcohol such as, for example, glycols and diols. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation reaction involving the corresponding monomer. The term "repeating unit", as used herein, means an organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a polyester.

The expression "roll-on shrink-on" (abbreviated herein as "ROSO"), as used herein, is understood to be synonymous with the expression "roll-applied shrink-on" (abbreviated herein as "RAS"), and refers to labels that are applied to a container by affixing the label to the container and rolling or spinning the container to wrap the label around the container. Typically, the labels are fed to the labeling process from a roll, but also can be provided as individual labels in what is known in the art as a "cut and stack" process.

The term "substrate", as used herein, means a surface to which the hot-melt adhesive is applied and adheres. Non-limiting examples of substrates include films, bottles, boxes, jars, and the like that can be prepared from materials such as, for example, plastics, wood, metal, paper, glass, or combinations thereof.

The polyesters that are used in the hot-melt adhesives of present invention comprise dicarboxylic acid residues and diol residues. The polyesters of the present invention contain substantially equal molar proportions of diacid residues (100 mole percent) and diol residues (100 mole percent) which react in substantially equal proportions such that the total moles of repeating units is equal to 100 mole %. The mole percentages provided in the present disclosure, therefore, may be based on the total moles of diacid residues, the total moles of diol residues, or the total moles of repeating units. For example, a polyester containing 30 mole percent adipic acid, based on the total diacid residues, means the polyester contains 30 mole percent adipic acid residues out of a total of 100 mole percent diacid residues. Thus, there are 30 moles of adipic acid residues among every 100 moles of diacid residues. In another example, a polyester containing 30 mole percent triethylene glycol, based on the total diol residues, means the polyester contains 30 mole percent triethylene glycol residues out of a total of 100 mole percent diol residues. Thus, there are 30 moles of triethylene glycol residues among every 100 moles of diol residues.

The hot-melt adhesive of our invention comprises about 50 to 100 weight percent, based on the total weight of the adhesive composition of a low-molecular weight, thermoplastic polyester as its base material. The polyester comprises diacid residues comprising about 70 to 100 mole percent, based on the total moles of diacid residues, of the residues of 1,4-cyclohexanedicarboxylic acid. For example, the polyester can have from about 80 to about 100 mole percent of the residues of 1,4-cyclohexanedicarboxylic acid. Other examples of mole percentage ranges of 1,4-cyclohexanedicarboxylic acid are about 90 to 100 mole percent, about 95 to about 100 mole percent, about 90 to about 95 mole percent, and about 90 to about 97 mole percent.

In addition to 1,4-cyclohexanedicarboxylic acid, the polyester can comprise 0 to about 30 mole percent of the residues of at least one modifying dicarboxylic acid having about 4 to about 40 carbon atoms. Some representative examples of modifying dicarboxylic acids include, but are not limited to, succinic acid, glutaric acid, adipic acid, suberic acid, pimelic acid, fumaric acid, maleic acid, itaconic acid, glycolic acid, sebacic acid, azelaic acid, dimer acid, terephthalic acid, isophthalic acid, and combinations thereof. For example, the modifying dicarboxylic acid can comprise adipic acid, glutaric acid, dimer acid, or combinations thereof. The polyester also may comprise the residues of dicarboxylic acids containing specialized functionalities such as, for example, 5-sodiosulfoisophthalic, t-butyl isophthalic, 5-hydroxy isophthalic, and 4,4'-sulfonyl dibenzoic. Where cis and trans isomers are possible, the pure cis or trans or a mixture of cis and trans isomers may be used.

The diol component of the base polyester comprises about 70 to about 100 mole percent, based on the total moles of diol residues, of the residues of at least two diols chosen from 1,4-cyclohexanedimethanol, triethylene glycol, and diethylene glycol. For example, in one embodiment of the invention, the polyester can comprise diol residues comprising about 35 to about 65 mole percent of the residues of triethylene glycol, and about 20 to about 60 mole percent of the residues of diethylene glycol. The diol component also may comprise about 30 to about 0 mole percent of the residues of at least one modifying diol. Examples of modifying diols include ethylene glycol, 1,2-propanediol, 1,3-propanediol, 1,5-pentanediol, neopentyl glycol, 1,6-hexanediol, 1,8-octanediol, 2,2,4-trimethyl-1,3-pentanediol, polyethylene glycol, polypropylene glycol, polytetramethylene glycol, 2,4-dimethyl-2-ethylhexane-1,3-diol; 2,2,4,4-tetramethyl-1,3-cyclobutanediol, 2,2-dimethyl-1,3-propanediol, 2-ethyl-2-butyl-1,3-propanediol, 2-ethyl-2-isobutyl-1,3-propanediol, 1,3-butanediol, 1,5-pentanediol, or combinations thereof.

As noted above, polyglycols such as, for example, tetraethylene glycol and other polyalkylene glycols, may be used in combination with two or more of 1,4-cyclohexanedimethanol, triethylene glycol, or diethylene glycol. Many of these glycols are available commercially such as, for example, the polyalkylene glycols produced by Dow Chemical Company under the CARBOWAX™ trade name. The molecular weight of the polyalkylene glycols, typically, will be from about 200 to about 10,000 g/mole. For example, the polyester also may comprise the residues of higher order alkyl analogs such as, for example, dipropylene glycol, dibutylene glycol, and dihexylene glycol. Similarly, higher order polyalkylene diols are useful, particularly polypropylene glycol and polytetramethylene glycols with molecular weights ranging from 200 to 10,000 g/mole.

In one example, the polyester of the hot-melt adhesive composition can comprise diacid residues comprising about 80 to about 100 mole percent of the residues of 1,4-cyclohexanedicarboxylic acid and 0 to about 20 mole percent of the residues of at least one modifying dicarboxylic acid; and diol residues comprising 30 to about 65 mole percent of the residues of 1,4-cyclohexanedimethanol, about 20 to about 65 mole percent of the residues of triethylene glycol, diethylene glycol, or a combination thereof, and about 0 to about 30 mole percent of the residues of a modifying diol. In another embodiment, the above modifying dicarboyxlic acid can comprise adipic acid, glutaric acid, dimer acid, or combinations thereof; and the above modifying diol can comprise polypropylene glycol.

In another example, the diacid residues comprise about 90 to about 95 mole percent of the residues of 1,4-cyclohexanedicarboxylic acid and about 5 to about 10 mole percent of the residues of dimer acid; and the diol residues comprise about 40 to about 60 mole percent of the residues of 1,4-cyclohexanedimethanol, about 60 to about 40 mole percent of the residues of triethylene glycol, diethylene glycol, or a combination thereof; and 0 to about 20 mole percent of the residues of polypropylene glycol. In yet another example, the adhesive composition can comprise a copolymer of 1,4-cyclohexane dicarboxylic acid and 1,4-cyclohexanedimethanol that further comprises 0 to 30 mole percent of one or more of adipic, isophthalic or dimer acid, and 20 to 80 mole percent of one or more of diethylene glycol or triethylene glycol, and 0 to about 20 mole percent of the residues of polyethylene glycol, polypropylene glycol, or a combination thereof.

The polyester of our novel hot-melt adhesive can have an inherent viscosity of about 0.1 to about 0.4 dL/g as measured at 25° C. using 0.5 grams of polymer per 100 ml of a solvent comprising 60 weight percent phenol and 40 weight % tetrachloroethane. Some additional examples of inherent viscosities for the polyester are about 0.1 to about 0.38; about 0.1 to about 0.35; about 0.1 to about 0.33; about 0.1 to about 0.30; about 0.1 to about 0.27; about 0.1 to about 0.25; and about 0.1 to about 0.20. In order to achieve this relatively low viscosity, the molecular weight of the polyester, typically, will be in the range of about 1000 to about 15,000 g/mole. Some additional examples of molecular weight ranges of the polyester are about 1000 to about 13,000 g/mole, about 1000 to about 10,000 g/mole; and about 1000 to about 8000 g/mole.

The polyester can also incorporate from 0 to about 5 mole percent of one or more monofunctional chain terminators to help control the rate of polymerization. These chain terminators are well known in the art. Some non-limiting examples of chain terminators are one or more monofunctional linear aliphatic, cycloaliphatic, or aromatic carboxylic acids or monofunctional alcohols having 1 to about 36 carbon atoms. These chain terminators can contain any functional group. The functional groups can be, for example, an ionic end group such as, for example, sodiosulfobenzoic acid; a reactive end group; or combinations thereof. These various functional groups may be used to tailor the end groups of the polyester to be more acidic or basic in nature. These modifications can be useful, for example, to improve surface interaction between adhesive and substrate, or to improve compatibility between the adhesive and certain formulating ingredients.

The polyester typically will have a melting temperature of about 80 to about 130° C. Most polymers will exhibit one or more smaller melting peaks by differential scanning calorimetry ("DSC") at temperatures below the primary melting temperature that have characteristics (e.g., melting enthalpy and peak temperature) that can be dependent on the thermal history of the polymer. The term "melting temperature" (abbreviated herein as "Tm"), as used herein, is defined as the peak temperature of the melting endotherm of the 2nd heat cycle. For example, if multiple melting peaks are present, then the highest peak melting temperature is considered the melting temperature of the polyester in accordance with the invention. Other examples of melting temperature ranges are about 90 to about 120° C. and about 100 to about 120° C. It is also desirable for roll-applied shrink-on applications that the molten polyester recrystallize below the shrink onset temperature of the label. Thus, in one embodiment of the invention, the polyester of the hot-melt adhesive has a recrystallization temperature of about 0 to about 80° C. Other examples of recrystallization temperatures are about 0 to about 75° C., about 0 to about 70° C., about 0 to about 65° C., about 0 to about 60° C., about 0 to about 55° C., and about 0 to about 50° C. The recrystallization temperature can be determined by DSC as either the recrystallization temperature upon heating "Tch" (at 20° C./min) or upon cooling "Tcc" (20° C./min) as described herein.

The polyester has a heat of melting (abbreviated herein as "ΔHm") of about 0.1 cal/g to about 6 cal/g as measured by differential scanning calorimetry. The heat of melting is proportional to how much crystallinity is present in the polyester. Typically, ΔHm is normalized by the weight of the sample being tested and reported as either J/g or cal/g. Other examples of heat of melting ranges are about 0.1 to about 4 cal/g, about 0.3 to about 4 cal/g, and about 0.5 and 3 cal/g.

The heat of fusion (abbreviated herein as "ΔHf"), is an intrinsic material parameter (i.e. it does not depend on heat history) and represents the value of ΔHm that would be obtained for a 100% crystalline solid. The value of ΔHf is a theoretical number, and typically can be determined by correlating and extrapolating DSC measurements with other measurements (e.g. x-ray) or by theoretical calculation. The term "heat of fusion", as used herein, is synonymous with the terms "enthalpy of fusion," "latent heat of fusion," "enthalpy change of fusion", and "specific melting heat," and is understood to mean the amount of thermal energy which must be absorbed or evolved for 1 gram of the polyester to change states from a solid to a liquid or vice versa. If the heat of fusion is known for a given polymer, then the % crystallinity can be estimated by the following equation:

$$\% \text{ crystallinity} = \Delta Hm/\Delta Hf * 100\%$$

Typically, ΔHf is difficult to determine and is rarely available. Because ΔHm, is directly proportional to crystallinity of a polymer, ΔHm is reported herein as an indirect measure of crystallinity.

The polyesters of the instant invention are readily prepared from the appropriate dicarboxylic acids, esters, anhydrides, or salts, and the appropriate diol or diol mixtures using typical polycondensation reaction conditions by procedures known to persons skilled in the art. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The reaction of the diol and dicarboxylic acid may be carried out using conventional polyester polymerization conditions or by melt phase processes. For example, when preparing the polyester by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). For example, the temperature for the ester interchange reaction can range from about 180° C. to about 230° C. for about 1 to about 4 hours while the pressure ranges from about 103 kPa gauge (15 psig) to about 276 kPa gauge (40 psig). Thereafter, the reaction product is heated under higher temperatures and under reduced pressure to form the polyester with the elimination of diol, which is readily volatilized under these conditions and removed from the system. This second step, or polycondensation step, is continued under higher vacuum and a temperature which generally ranges from about 230° C. to about 350° C. for about 0.1 to about 6 hours, until a polymer having the desired degree of polymerization, as determined by inherent viscosity, is obtained. The polycondensation step can be advantageously conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of polyester by direct esterification, i.e., from the acid form of the dicarboxylic acid component, polyesters are produced by reacting the dicarboxylic acid or a mixture of dicarboxylic acids with the diol component or a mixture of diol components. The reaction is conducted at a pressure of about 7 kPa gauge (1 psig) to about 1379 kPa gauge (200 psig), preferably less than 689 kPa (100 psig) to produce a low molecular weight polyester product having an average degree of polymerization of from about 1.4 to about 10. The temperatures employed during the direct esterification reaction typically range from about 180° C. to about 280° C. This low molecular weight polymer may then be polymerized by a polycondensation reaction.

Although the polyester may be used neat as the only component of the hot-melt adhesive, the hot-melt adhesive composition can also include blends of multiple polymers, tackifiers, extenders, modifiers, adhesion promoters, nucleators, rosins, and the like, to control rheology, crystallinity and processability as needed. Other possible additives include antioxidants, adhesion promoters or coupling agents (silane and non-silane based), solvent, water, ultraviolet-light-curable reactive oligomers, crosslinking agents, photoinitiators (reactive resin prepolymer and/or photosensitizing agent), fillers (reinforcing, neutralizing conductive, flame retardant, water soluble, expandable), compatibilizers, detackifiers, flame proof agents, polyethylene glycols ("PEGS"), indicators, metal particles, toughening agents, waxes, reactive diluents, coloring agents and/or pigments, thixotropic agents, chopped fiber, inorganics (silica, carbonates, oxides, fluorides, talc, clay and sulfates), organics (cellulose, jute), biocides, dessicants, blowing agents, humectants, and impact modifiers. The adhesive can also be a blend of one or more polymers, which might be useful, for example, when two of more substrates of differing materials are involved.

For example, the adhesive composition can comprise up to 50 weight percent of a tackifier, plasticizer, wax, nucleator, or combinations thereof. Some non-limiting examples of tackifiers include tall oil, gum or wood rosin either unmodified, partially hydrogenated, fully hydrogenated or disproportionated, polymerized rosins, rosin derivatives such as rosin esters, phenolic modified rosin esters, acid modified rosin esters, distilled rosin, dimerized rosin, maleated rosin, and polymerized rosin; hydrocarbon resins including aliphatic and aromatic resins, coumarone-indene resins, polyterpenes, terpene-phenolic resins, phenolic resins, maleic resins, ketone resins, reactive resins, hybrid resins, and polyester resins. In one embodiment, for example, the tackifier can comprise a tall oil rosin, gum rosin, wood rosin, hydrogenated rosin, polymerized rosin, disproportionated rosin, aromatic hydrocarbon resin, coumarone-indene resin, polyterpene, terpene-phenolic resin, phenolic resin, maleic resin, ketone resin, polyester resin, or combinations thereof. The hydrocarbon resin can be hydrogenated or partially hydrogenated. Some further examples of tackifiers can be found in U.S. Pat. Nos. 5,418,052; 5,442,001; and 5,532,306. Other examples of tackifiers include, but are not limited to, styrene and alpha methyl styrene resins, glycerol and pentaerithritol esters, and the like. Some examples of tackifiers that are available commercially include WINGTACK 95™ (available from Goodyear), EASTOTAC H100™ and KRYSTALEX™ 3100 (both available from Eastman Chemical Co.), and ECR 149B™ or ECR 179A™ (available from Exxon Chemical Co.) Other tackifiers include rosin and its derivatives available from Reichold Chemicals. In one example, the adhesive comprises a tackifier comprising at least one hydrogenated rosin having an acid number of about 145 to about 175 mg KOH/gram of rosin.

The adhesive composition also can comprise one or more plasticizers to reduce the glass transition temperature and/or the viscosity of the polyester component. Examples of plasticizers include benzoate esters, phthalate esters, citrate esters, phosphate esters, terephthalate esters, isophthalate esters, or combinations thereof. Some examples of phthalate plasticizers include dioctyl phthalate and butyl benzyl phthalate; liquid polyesters (non-crystalline) such as DYNACOL 720™ (available from Huls); benzoate plasticizers such as 1,4-cyclohexane dimethanol dibenzoate (e.g., BENZOFLEX 352™ available commercially from Velsicol), diethylene glycol/dipropylene glycol dibenzoate (e.g., BENZOFLEX 50™ available commercially from Velsicol) and diethylene glycol dibenzoate where the mole fraction of hydroxyl groups which have been esterified ranges from 0.5 to 0.95 (e.g., BENZOFLEX 2-45™ High Hydroxyl also from Velsicol); phosphate plasticizers such as t-butylphenyl diphenyl phosphate (e.g., SANTICIZER™, available commercially from Ferro Corporation); poly(ethylene glycol) with molecular weights below about 1000 and derivatives of poly(ethylene glycol) (e.g., PYCA™L 94, the phenyl ether of PEG, available commercially from ICI); ethoxylated bis phenol A (e.g., MACOL 206 EM from PPG Industries); dinonyl phenol ethyoxylates (e.g., SURFONIC™ DNP 100, available commercially from Huntsman Chemical Corp.); as well as vegetable and animal oils such as glycerol esters of fatty acids and polymerization products thereof. For example, the adhesive compostion can comprise benzoate esters such as 1,4-cyclohexanedimethanol dibenzoate, neopentyl glycol dibenzoate, dipropylene glycol dibenzoate, propylene glycol dibenzoate, isodecyl benzoate, alkyl benzoate ester, or combinations thereof.

The adhesive composition also can comprise one or more compatible waxes to improve the bond strength, prevent or reduce cold flow, and to decrease set time. Some representative examples of compatible waxes are described in U.S. Pat. No. 5,750,605. These compounds generally have molecular weights below 500 g/mole with at least one polar group to facilitate compatibility with the base polyester and a crystalline melting point. Higher concentrations of polar groups are necessary for higher molecular weight waxes. These polar groups include hydroxyls, amides (primary, secondary, and tertiary), sulfones, phosphate esters, sulfonamides, carbonates, ureas, amines, urethanes, and carboxylic acids; and carboxylate, urea, and sulfonate salts. For example, some waxes that can be used in the adhesive composition include 12-hydroxystearamide, N-(2-hydroxy ethyl)-12-hydroxystearamide, known by the trademark PARICIN™ 220 (available from CasChem), stearamide, known as KENAMIDE™ S (available from Witco), glycerin monostearate, sorbitan monostearate, and 12-hydroxy stearic acid. Also useful in combination with the above are the less polar waxes such as N,N'-ethylene-bis-stearamide (KEMAMIDE™ W-40 from Witco), hydrogenated castor oil (castor wax), oxidized synthetic waxes, and functionalized synthetic waxes such as oxidized polyethylene waxes (PETROLITE™ E-1040).

Nucleators may be used with the adhesive composition to modify and control crystallinity formation. The term "nucleator", as used herein, is intended to be synonymous with the term "nucleating agent" and refers to a chemical substance which, when incorporated into polymers, form nuclei for the growth of crystals in the polymer melt. Any incompatible material can serve as a nucleator provided that it rapidly separates into particles as the molten adhesive cools. A variety of organic and inorganic nucleators well-known in the art can be used. For example, in one embodiment of the invention, the adhesive composition comprises one or more nucleators comprising a low molecular weight polyolefin and/or olefinic ionomer with melting temperature ranging from about 70° C. to 130° C.

In one example, our inventive adhesive composition can comprise a tackifier comprising at least one hydrogenated rosin having an acid number of about 145 to about 175 mg KOH/gram of rosin; a plasticizer comprising 1,4-cyclohexanedimethanol dibenzoate, neopentyl glycol dibenzoate, dipropylene glycol dibenzoate, propylene glycol dibenzoate, isodecyl benzoate, alkyl benzoate esters having 7 to 40 carbon atoms, or combinations thereof; and a nucleator comprising polyethylene, polypropylene, olefinic ionomers, or combinations thereof. In another embodiment, the adhesive composition can comprise about 50 to about 70 weight percent of a polyester as set forth above, about 20 to about 40 weight percent of a hydrogenated rosin, and about 5 to about 15 weight percent of a plasticizer comprising 1,4-cyclohexanedimethanol dibenzoate, a wax comprising stearamide, 12-hydroxystearamide, N-(2-hydroxy ethyl)-12-hydroxystearamide, or a combination thereof, or a combination of a plasticizer and wax.

The adhesive of the present invention can be blended with other polymers to extend or enhance performance. These polymers include, but are not limited to polyolefins, amorphous polyolefins, copolyester, sulfopolyesters, polyurethanes, polyamides, ethylene-vinyl acetate (EVA), vinyl acetate-ethylene (VAE), natural rubber, polybutenes, polyisobutylene, styrene-butadiene rubber, styrenic di-, tri- and multi-block copolymers (styrene-isoprene-styrene, styrene-butadiene-styrene, styrene-ethylene/propene-styrene, styrene-ethylene/butene-styrene, styrene-isoprene/butadiene-styrene), nitrile rubber, ethylene-propylene-diene modified rubber, silicones, vinylpyrrolidones, ethylene acrylics, polyvinyl alcohols, acrylics, and blends thereof. Also included are functionalized polymers such as, for example, epoxidized or carboxyl terminated polymers.

The adhesive composition typically has a melt viscosity from about 300 to about 3000 centipoise at 150° C. Melt viscosity can be determined using methods well known in art such as, for example, using a Brookfield DVII Viscometer equipped with a thermosel and number 27 spindle in accordance with ASTM Method D3236, *"Apparent Viscosity of Hot Melt Adhesives and Coating Materials"*. Additional examples of the melt viscosity at 150° C. are about 300 to about 2500 centipoise, about 300 to about 2000 centipoise, about 500 to about 2500 centipoise, about 300 to about 700 centipoise, and 1000 centipoise or less. When the hot melt adhesive composition is used for shrink labels, it is generally desirable for the melt viscosity of the adhesive to be at or below about 3000 centipoise, or in another embodiment, at or below about 2000 centipoise, at the shrink onset temperature ("$T_{so}$") of the label + about 80° C. For example, the shrink onset temperature for many films that are used for RAS applications is approximately 70° C.; thus, the temperature for the latter melt viscosities of the hot melt adhesive composition is about $T_{so}$+80° C.=150° C. Persons skilled in the art will understand that the above temperatures and viscosities can be adjusted in accordance with the shrink onset temperatures of the film substrates. It should be noted that the above viscosities are for the formulated adhesive and can include the effects of plasticizers, tackifiers, base polymer, and other additives. Typically the additives should not exceed about 50% by weight of the total adhesive formulation.

Another aspect of our invention is a hot-melt adhesive composition, comprising:

A. about 90 to 100 weight percent, based on the total weight of the adhesive composition, of at least one polyester, comprising (i) diacid residues, comprising about 80 to 100 mole percent, based on the total moles of diacid residues, of the residues of 1,4-cyclohexanedicarboxylic acid, and 0 to about 20 mole percent of the residues of adipic acid, dimer acid, or a mixture thereof; and (ii) diol residues, comprising about 40 to about 60 mole percent, based on the total moles of diol residues, of the residues of 1,4-cyclohexanedimethanol and about 60 to about 40 mole percent of the residues of triethylene glycol, diethylene glycol, or a mixture thereof; and B. 0 to about 5 weight percent of at least one nucleator wherein the polyester has an inherent viscosity of about 0.1 to about 0.3 dL/g as measured at 25° C. using 0.5 grams of polymer per 100 ml of a solvent comprising 60 weight percent phenol and 40 weight % tetrachloroethane, a melting temperature of about 80 to about 120° C., and a heat of melting of about 0.1 cal/g to about 4 cal/g; and wherein the adhesive composition has a melt viscosity of about 300 to about 3000 centipoise at 150° C. The above adhesive composition is understood to include the various embodiments of the polyester, inherent viscosity, heat of melting, plasticizers, waxes, nucleators, and tackifiers described hereinabove in any combination. For example, the adhesive composition can comprise about 0.1 to about 5 weight percent of the nucleator comprising polyolefins, olefinic ionomers, or combinations thereof having a melting temperature of about 70 to about 130° C. In another example, the polyester of the hot-melt adhesive can have inherent viscosity ranges of about 0.1 to about 0.38; about 0.1 to about 0.35; about 0.1 to about 0.33; about 0.1 to about 0.30; about 0.1 to about 0.27; about 0.1 to about 0.25; and about 0.1 to about 0.20.

The hot melt adhesive compositions may be formulated using techniques known in the art. For example, the polyester, tackifiers, plasticizers, waxes, nucleators, and other additives can be mixed as a melt in a jacketed mixing kettle, preferably in a jacketed heavy duty mixer. Mixing and heating can be continued until a smooth, homogeneous mass is obtained and the remainder of the compound is thoroughly and uniformly admixed therewith. Formulation can be performed using equipment well known in the art including batch mixers, Banbury mixers, kneaders, twin and single screw continuous compounders, roll mills, and high shear mixers (Z-blade or sigma blade). Compounding can be performed in either air or inert gas. The adhesive can be dried before application, if preferred, but is usually not necessary.

Ring and ball softening points are not critical for the adhesive of the present invention and are typically above about 60° C. The compatibility and wetting characteristics of the adhesive on the substrate can depend partly on the difference in surface tensions of the adhesive and substrate. For example, the surface tension of the adhesive composition can be less than that of the substrate. In another embodiment, the surface tension of the adhesive composition is within about 5 dynes/cm of the substrate. In yet another example, the surface tension is within about 3 dynes/cm of the substrate. If 2 different substrates are involved such as, for example, a label and container, then the adhesive can have a surface tension that is less than both substrates or, alternatively, within about 5 dynes/cm of both substrates. Multiple adhesives also can be used for gluing multiple substrates through multiple adhesive applicators.

The hot-melt adhesive compositions of the invention may be used to bond a wide range of substrates in addition to polyester labels, films, and containers. For example, the adhesive composition may be used on films prepared from polystyrene, polyolefin, polyvinyl chloride, nylon, polycarbonate, styrene-acrylonitrile, acrylonitrile-butadiene-styrene polymer, styrene-butadiene copolymers, acrylics, polysulfones, polyethersulfones, blends of the above polymers, and the like. In another example, the adhesive compositions can be used to adhere labels to glass, plastic, and metal containers. Representative examples plastic containers include those made from polyesters (such as poly(ethylene) terephthalate, "PET"), polycarbonate, polyethylene, polypropylene, polystyrene, and nylons.

Another aspect of our invention, therefore, is a container, comprising a label adhered thereto with a hot-melt adhesive composition, comprising A. about 50 to 100 weight percent, based on the total weight of the adhesive composition, of at least one polyester, comprising (i) diacid residues, comprising about 70 to 100 mole percent, based on the total moles of diacid residues, of the residues of 1,4-cyclohexanedicarboxylic acid, and 0 to about 30 mole percent of the residues of at least one modifying dicarboxylic acid having about 4 to about 40 carbon atoms; and (ii) diol residues, comprising about 70 to about 100 mole percent, based on the total moles of diol residues, of the residues of at least two diols chosen from 1,4-cyclohexanedimethanol, triethylene glycol, and diethylene glycol, and about 30 to about 0 mole percent of the residues of at least one modifying diol; and B. 0 to about 50 weight percent of a tackifier, plasticizer, wax, nucleator, or combination thereof;

wherein the polyester has an inherent viscosity of about 0.1 to about 0.4 dL/g as measured at 25° C. using 0.5 grams of polymer per 100 ml of a solvent comprising 60 weight percent phenol and 40 weight % tetrachloroethane, a melting temperature of about 80 to about 130° C., and a heat of melting of about 0.1 cal/g to about 6 cal/g; and wherein the adhesive composition has a melt viscosity of about 300 to about 3000 centipoise at 150° C.

The above adhesive composition is understood to include the various embodiments of the polyester, inherent viscosity, heat of melting, plasticizers, waxes, nucleators, and tackifiers described hereinabove in any combination.

For example, the hot-melt adhesive composition can comprise a polyester comprising diacid residues which comprise about 80 to about 100 mole percent of the residues of 1,4-cyclohexanedicarboxylic acid and 0 to about 20 mole percent of the residues of at least one modifying dicarboxylic acid chosen from adipic acid, glutaric acid, and dimer acid; and diol residues comprising 30 to about 65 mole percent of the residues of 1,4-cyclohexanedimethanol and about 20 to about 65 mole percent of the residues of triethylene glycol, diethylene glycol, or a combination thereof, and about 0 to about 30 mole percent of the residues of polypropylene glycol. In another example, the polyester of the adhesive composition can comprise diol residues comprising about 35 to about 65 mole percent of the residues of triethylene glycol, and about 20 to about 60 mole percent of the residues of diethylene glycol. In yet another example, the polyester of the hot-melt adhesive composition can comprise diacid residues comprising about 90 to about 95 mole percent of the residues of 1,4-cyclohexanedicarboxylic acid and about 5 to about 10 mole percent of the residues of dimer acid; and diol residues comprise about 40 to about 60 mole percent of the residues of 1,4-cyclohexanedimethanol, about 60 to about 40 mole percent of the residues of triethylene glycol, diethylene glycol, or a combination thereof; and 0 to about 20 mole percent of the residues of polypropylene glycol. The polyester of the hot-melt adhesive can have an inherent viscosity of about 0.1 to about 0.4 dL/g as described hereinabove. Some additional examples of inherent viscosities for the polyester are about 0.1 to about 0.38; about 0.1 to about 0.35; about 0.1 to about 0.33; about 0.1 to about 0.30; about 0.1 to about 0.27; about 0.1 to about 0.25; and about 0.1 to about 0.20. In order to achieve this relatively low viscosity, the molecular weight of the polyester, typically, will be in the range of about 1000 to about 15,000 g/mole. Some additional examples of molecular weight ranges of the polyester are about 1000 to about 13,000 g/mole, about 1000 to about 10,000 g/mole; and about 1000 to about 8000 g/mole.

In addition, the polyester typically will have a melting temperature of about 80 to about 130° C. Other examples of melting temperatures are about 90 to about 120° C. and about 100 to about 120° C. The polyester, as noted previously, has a heat of melting of about 0.1 cal/g to about 6 cal/g. Other examples of heat of melting ranges are ranges are about 0.1 to about 4 cal/g, about 0.3 to about 4 cal/g, and about 0.5 and 3 cal/g. Also, as described previously, the adhesive composition can comprise from 0 to 50 weight percent of a tackifier, plasticizer, wax, nucleator, or combination thereof. For example, in one embodiment, the tackifier can comprise a tall oil rosin, gum rosin, wood rosin, hydrogenated rosin, polymerized rosin, disproportionated rosin, aromatic hydrocarbon resin, coumarone-indene resin, polyterpene, terpene-phenolic resin, phenolic resin, maleic resin, ketone resin, polyester resin, or combinations thereof. The hydrocarbon resin can be hydrogenated or partially hydrogenated. In one embodiment, the adhesive comprises a tackifier comprising at least one hydrogenated rosin having an acid number of about 145 to about 175 mg KOH/gram of rosin.

Examples of plasticizers include benzoate esters, phthalate esters, citrate esters, phosphate esters, terephthalate esters, isophthalate esters, or a combinations thereof. For example, the adhesive composition can comprise benzoate esters such as 1,4-cyclohexanedimethanol dibenzoate, neopentyl glycol dibenzoate, dipropylene glycol dibenzoate, propylene glycol dibenzoate, isodecyl benzoate, alkyl benzoate esters, or combinations thereof.

Representative examples of some waxes that can be used in the adhesive composition include 12-hydroxystearamide, N-(2-hydroxy ethyl)-12-hydroxystearamide, stearamide, glycerin monostearate, sorbitan monostearate, and 12-hydroxy stearic acid. Representative examples of nucleators include, but are not limited to, low molecular weight polyolefins or olefinic ionomers with melting temperature ranging from about 70° C. to 130° C., or a combination thereof. For example, in one embodiment, our inventive adhesive composition can comprise a tackifier comprising at least one hydrogenated rosin having an acid number of about 145 to about 175 mg KOH/gram of rosin; a plasticizer comprising 1,4- cyclohexane dimethanol dibenzoate, neopentyl glycol dibenzoate, dipropylene glycol dibenzoate, propylene glycol dibenzoate, isodecyl benzoate, alkyl benzoate esters having 7 to 40 carbon atoms, or combinations thereof; and a nucleator comprising polyethylene, polypropylene, olefinic ionomers, or combinations thereof. In another embodiment, the adhesive composition can comprise about 50 to about 70 weight percent of a polyester as set forth above, about 20 to about 40 weight percent of a hydrogenated rosin, and about 5 to about 15 weight percent of a plasticizer comprising 1,4-cyclohexanedimethanol dibenzoate, a wax comprising stearamide, 12-hydroxystearamide, N-(2-hydroxy ethyl)-12-hydroxystearamide, or a combination thereof, or a combination of a plasticizer and a wax.

In another embodiment, the hot-melt adhesive composition of the container can comprise a tackifier comprising at least one hydrogenated rosin having an acid number of about 145 to about 160 mg KOH/gram of rosin; a plasticizer comprising 1,4-cyclohexanedimethanol dibenzoate, neopentyl glycol dibenzoate, dipropylene glycol dibenzoate, propylene glycol dibenzoate, isodecyl benzoate, alkyl benzoate esters having 7 to 40 carbon atoms, or combinations thereof; and a nucleator comprising polyethylene, polypropylene, olefinic ionomers, or combinations thereof. In yet another example, the adhesive composition of the container can comprise about 50 to about 70 weight percent of the polyester, about 20 to about 40 weight percent of a hydrogenated rosin, and about 5 to about 15 weight percent of a plasticizer comprising 1,4-cyclohexanedimethanol dibenzoate, a wax comprising stearamide, 12-hydroxy-stearamide, N-(2-hydroxy ethyl)-12-hydroxystearamide or a combination thereof, or a combination of a plasticizer and a wax.

The container comprises a label adhered to the container with the hot-melt adhesive described above. The label can have at least one layer and can be prepared from a variety of materials such as, for example, polyester, polyolefin, polyvinylchloride, nylon, polylactic acid, paper, metal, polycarbonate, acrylic, or polystyrene film. For example, the label can be a shrink label. In addition, the label can be monolayer or multilayer, coextruded, laminated, clear, opaque, pigmented, metallized, perforated, printed, or have any other typical modification well known in the art. For multilayer labels, the individual layers can comprise 2 or more different polymers such as, for example, polyester with polystyrene, polyester with polypropylene, and polystyrene with polypropylene. Similarly, the layers can be produced by blending one or more materials together and also can include blending multiple polyesters together to achieve a certain shrink performance. The film can also be microvoided or foamed to reduce density and improve recyclability, and these in turn, can be monolayer or multilayer with the voided layers on the inside, outside or any combination thereof. Additives, pigments, dyes, antiblocks, slips, lubricants, pinning additives, antistats, UV absorbers, scavengers, and other processing aids/additives known in the art can also be added to the film although care is required to insure that these additives do not interfere with the performance of the hot-melt adhesive. There is no limit on the film thickness, although the range is typically between about 10 and 100 microns for RAS labels.

The hot-melt adhesive is particularly useful for adhering and seaming roll-applied, shrink labels prepared from polyester films. These polyester labels can be attached to variety of containers such as, for example, bottles, jars, cans, boxes, and battery casings. The container can be of any material such as, for example, plastics such as polyester, polyethylene, polypropylene, nylon, polycarbonate, polystyrene, styrene-acrylonitrile, acrylonitrile-butadiene-styrene polymer, styrene-butadiene copolymers, acrylics, polysulfones, polyethersulfones, blends of the above polymers, and the like; metal, glass, or combinations of any of these materials.

For example, the container can be a poly(ethylene) terephthalate ("PET") bottle or jar with a polyester shrink label. This combination is convenient for recycling of polyester polymers. Because the polyester-based, hot-melt adhesive is compatible with PET, any adhesive residue that gets carried through with PET recycle flake will not cause contamination or haze problems. Generally, the adhesive will mix and transesterify with the PET during subsequent reprocessing and have little or no negative effect.

The polyester label can comprise a single polyester or a blend of 2 or more polyesters. For example, the polyester or polyester blend can comprise about 80 to 100 mole percent, based on the total diacid residues, of the residues of terephthalic acid and 0 to 20 mole percent of one or more modifying acids that include, but are not limited to, isophthalic acid, malonic acid, succinic acid, glutaric acid, 1,3-cyclohexanedicarboxylic acid, 1,4-cyclohexanedicarboxylic acid, adipic acid, suberic acid, sebacic acid, azelaic acid, dimer acid, dodecanedioic acid, sulfoisophthalic acid, 2,6-decahydronaphthalene-dicarboxylic acid, 4,4'-biphenyldicarboxylic, 3,3'- and 4,4-stilbenedicarboxylic acid, 4,4'-dibenzyldicarboxylic acid, and 1,4-, 1,5-, 2,3-, 2,6, and 2,7-naphthalenedicarboxylic acid. The diol residues can comprise 60 to 99 mole percent of ethylene glycol with 1 to 40 mole percent of one or more modifying glycols that include, but are not limited to, 1,4 cyclohexanedimethanol, diethylene glycol propylene glycol, 1,3-propanediol, 2,4-dimethyl2-ethylhexane1,3-diol, 2,2-dimethyl-1,3-propanediol, diethylene glycol, 1,4-cyclohexanedimethanol, 2-ethyl-2-butyl-1,3-propanediol, 2-ethyl-2-isobutyl-1,3-pro-panediol, 1,3-butanediol, 1,4-butanediol, neopentyl glycol, 1,5-pentanediol, 1,6-hexane-diol, 1,8-octanediol, 2,2,4-trimethyl-1,6-hexanediol, thiodiethanol, 1,2-cyclohexane-dimethanol, 1,3-cyclohexanedimethanol, 2,2,4,4-tetramethyl-1,3-cyclobutanediol and the like.

In another example, the polyester or polyester blend can comprise about 90 to 100 mole percent, based on the total diacid residues, of the residues of terephthalic acid. In another example, the diacid residues of the polyester label may comprise about 95 to 100 mole percent of the residues of terephthalic acid. Some additional examples of terephthalic acid residue content in the polyester label are greater than about 90 mole percent, about 92 mole percent, about 95 mole percent, about 97 mole percent, and about 99 mole percent. The diacid residues of the polyester label may further comprise up to about 10 mole percent of the residues of a modifying carboxylic acid containing 4 to 40 carbon atoms if desired. For example, from 0 to about 10 mole percent of other aromatic dicarboxylic acids containing 8 to about 16 carbon atoms, cycloaliphatic dicarboxylic acids containing 8 to about 16 carbon atoms, acyclic dicarboxylic acids containing about 2 to about 16 carbon atoms, or mixtures thereof may be used. Examples of modifying dicarboxylic acids include, but are not limited to, malonic acid, succinic acid, glutaric acid, 1,3-cyclohexanedicarboxylic acid, 1,4-cyclohexanedicarboxylic acid, adipic acid, suberic acid, sebacic acid, azelaic acid, dimer acid, dodecanedioic acid, sulfoisophthalic acid, 2,6-decahydronaphthalenedicarboxylic acid, isophthalic acid, 4,4'-biphenyldicarboxylic, 3,3'- and 4,4-stilbenedicarboxylic acid, 4,4'-dibenzyl-dicarboxylic acid, and 1,4-, 1,5-, 2,3-, 2,6, and 2,7-naphthalenedicarboxylic acid. Where cis and trans isomers are possible, the pure cis or trans or a mixture of cis and trans isomers may be used.

The polyester label also comprises diol residues that comprise about 5 to about 89 mole percent, based on the total polyester diol residues, of the residues of ethylene glycol, about 10 to about 70 mole percent of the residues of 1,4-cyclohexanedimethanol, and about 1 to about 25 mole percent of the residues of diethylene glycol. The polyester may also comprise from 0 to about 10 mole percent of at least one modifying diol. Some representative examples of modifying diols are as listed above and include propylene glycol, 1,3-propanediol, 2,4-dimethyl-2-ethylhexane-1,3-diol, 2,2-dimethyl-1,3-pro-panediol, diethylene glycol, 1,4-cyclohexanedimethanol, 2-ethyl-2-butyl-1,3-propanediol, 2-ethyl-2-isobutyl-1,3-propanediol, 1,3-butanediol, 1,4-butanediol, neopentyl glycol, 1,5-pentanediol, 1,6-hexanediol, 1,8-octanediol, 2,2,4-trimethyl-1,6-hexanediol, thiodiethanol, 1,2-cyclohexanedimethanol, 1,3-cyclohexanedimethanol, 2,2,4,4-tetramethyl-1,3-cyclobutanediol and the like.

For example, the polyester label may comprise about 95 to 100 mole percent terephthalic acid residues, about 35 to about 89 mole percent ethylene glycol residues, and about 10 to about 40 mole percent 1,4-cyclohexanedimethanol residues, and about 1 to about 25 mole percent diethylene glycol residues. In another example, the polyester label can comprise about 50 to about 77 mole percent ethylene glycol residues, about 15 to about 35 mole percent 1,4-cyclohexanedimethanol residues, and about 8 to about 15 mole percent diethylene glycol residues. In yet another example, the polyester label can comprise about 90 to about 100 mole percent of the residues of terephthalic acid and about 52 to about 88 mole percent of the residues of ethylene glycol, about 10 to about 28 mole percent of the residues of 1,4-cyclohexanedimethanol, and about 2 to about 20 mole percent of the residues of diethylene glycol. Other possible combinations of mole percentage ranges for the terephthalic acid, ethylene glycol, 1,4-cyclohexanedimethanol, and diethylene glycol residues will be apparent to persons skilled in the art.

The polyester shrink labels used on the container of the invention, typically, are prepared by methods well-known to persons skilled in the art such as, for example, extrusion, calendering, casting, drafting, tentering, or blowing. These methods initially create an unoriented or "cast" film that is subsequently stretched in at least one direction to impart orientation. The term "oriented", as used herein, means that the polyester film is stretched to impart direction or orientation in the polymer chains. The polyester film, thus, may be "uniaxially stretched", meaning the polymer matrix is stretched in one direction or "biaxially stretched," meaning the polymer matrix has been stretched in two different directions. Typically, but not always, the two directions are substantially perpendicular. For example, in the case of a film, the two directions are in the longitudinal or machine direction ("MD") of the film (the direction in which the film is produced on a film-making machine) and the transverse direction ("TD") of the film (the direction perpendicular to the MD of the film). Biaxially stretched articles may be sequentially stretched, simultaneously stretched, or stretched by some combination of simultaneous and sequential stretching. In generally, stretch or draw ratios of about 1.1× to about 8× are imparted in one or more directions to create uniaxially or biaxially oriented films. The phrases "stretch ratio" and "draw ratio", are intended to be synonymous and refer to the length of the stretched film divided by the length of the unstretched film. For example, "machine direction draw ratio" or "MD draw ratio" refers to the draw ratio in the machine direction. Similarly, "TD draw ratio" refers to the draw ratio in the transverse direction. More typically, stretch ratios are from 4× to about 6×. The stretching can be performed, for example, using a double-bubble blown film tower, a tenter frame, a machine direction drafter, the drafting and drawdown section of a calendering line, or combination of these methods. Stretching is generally performed at or near the glass transition temperature (Tg) of the polymer. For polyesters, for example, this range is typically Tg+5° C. (Tg+10° F.) to about Tg+33° C. (Tg+60° F.), although the range may vary slightly depending on additives. A lower stretch temperature will impart more orientation with less relaxation (and hence more shrinkage), but may increase film tearing. To balance these effects, an optimum temperature in the mid-range is often chosen.

For example, the label may be prepared from a heat-shrinkable, polyester film that is stretched in the machine direction (MD) at a draw ratio of about 2 to about 7; about 2 to about 6; about 3 to about 7; about 3 to about 6; about 4 to about 7; or about 4 to about 6. Typically, in stretching the film, it may be initially heated to a temperature above its glass transition temperature. The film then may be stretched at of rate of about 10 to 300 meters per minute.

The polyester, heat-shrinkable film used in the label may be uniaxially oriented, meaning that the processing history may include stretching in the machine direction without stretching in the transverse direction. Alternatively, the heat-shrinkable film processing history may include additional stretching, either simultaneously or sequentially, in the transverse direction at a draw ratio of less than about 1.1, about 1.2, about 1.5, or about 2.0. For example, the heat-shrinkable film may be stretched in the machine direction at a draw ratio of about 2 to about 6 and in the transverse direction at a draw ratio of about 1.2 to about 1.6.

Post-stretch annealing or heat setting may be used to adjust shrink properties of the film, although annealing the film under tension can cause an increase in TD growth due to additional neck-in. The term "neck-in" refers to the decrease in width experienced by a web as it is stretched in the machine direction. Annealing times and temperatures will vary from machine to machine and with each formulation, but typically will range from about Tg to about Tg+50° C. for about 1 to about 15 seconds. Higher temperatures usually require shorter annealing times and are preferred for higher line speeds. The annealing process typically will reduce the MD shrinkage accordingly. Generally, to avoid additional neck-in and TD growth, annealing should be carried out while the film is under low tension. For example, in one embodiment, annealing is carried out under conditions that maintain post-stretch, total neck-in of the film web to 5% or less.

In one embodiment, the label comprises a machine direction (MD) oriented polyester film having an ultimate shrinkage of 20% or greater, preferably 40% or greater. In another embodiment, the film should have an off-axis shrinkage or growth (TD direction) of less than 10%. The phrase "TD growth or shrinkage", as used herein, is intended to mean TD growth or shrinkage as measured the drive side, center, or operator side of the film web from which the label is cut. For example, if any section of film exhibits TD growth or shrinkage exceeding about 10%, then that film would be considered to have a TD growth or shrinkage greater than 10%, even if other sections of the film web exhibited less than 10% growth or shrinkage. The film can be produced by any standard film process including simultaneous or sequential biaxial stretching, drafting, tentering, calendering, or blown film (single or double bubble). Typically, the polyester films described herein film will normally have a shrink onset temperature between 60 and 80° C.

For example, in one embodiment, the label can comprise a biaxially oriented film in which the heat-shrinkable film undergoes from about 25 to about 85 percent machine direction (MD) shrinkage and less than about 10% off-axis (TD) shrinkage shrinkage or growth when immersed in 95° C. water for 10 seconds. Films with these properties can be produced by (i) stretching in the machine direction (MD) at a draw ratio of about 3 to about 6 at a temperature above the glass transition temperature, (ii) stretching in the transverse direction (TD) at a draw ratio of about 1.1 to about 3, and (iii) annealing the film in the heatset portion of the tenter frame at a temperature between about 80 and 180° C.

In another embodiment, the label adhered to the container of the invention can have about 25 to about 85 percent machine direction shrinkage and about 0 to about 10 percent transverse direction shrinkage or growth when immersed in water at 95° C. for 10 seconds. Some additional examples of MD shrinkage that can characterize the heat-shrinkable label include about 25 to about 80%; about 25 to about 75%; about 25 to about 70%; about 25 to about 65%; about 25 to about 60%; about 25 to about 50%; about 25 to about 45%; about 25 to about 40%; about 30 to about 85%; about 30 to about 80%; about 30 to about 75%; about 30 to about 70%; about 30 to about 65%; about 30 to about 60%; about 30 to about 55%; about 30 to about 50%; about 35 to about 85%; about 35 to about 80%; about 35 to about 75%; about 35 to about 70%; about 35 to about 65%; about 35 to about 60%; about 35 to about 55%; about 35 to about 50%; about 40 to about 85%; about 40 to about 80%; about 40 to about 75%; about 40 to about 70%; about 40 to about 65%; about 40 to about 60%; about 40 to about 55%; about 40 to about 50%; about 45 to about 85%; about 45 to about 80%; about 45 to about 75%; about 45 to about 70%; about 45 to about 65%; about 45 to about 60%; about 45 to about 55%; about 50 to about 85%; about 50 to about 80%; about 50 to about 75%; about 50 to about 70%; about or 50 to about 60%. In addition, the heat-shrinkable label may have about 0 to about 4, 0 to about 5, 0 to about 6, 0 to about 7, 0 to about 8, or 0 to about 10 percent transverse direction shrinkage or growth.

The polyester label also may further comprise a voiding agent, comprising at least one polymer incompatible with the polyester film and dispersed therein. The terms "voids", "microvoids", and "micropores", as used herein, are intended to be synonymous and are well-understood by persons skilled in the art to mean tiny, discrete voids or pores contained within the polyester below the surface of the polyester film of the label that are intentionally created during the manufacture of the article. Similarly, the terms "voided", "microvoided", "cavitated" and "void-containing", as used herein in reference to the polyester label, are intended to be synonymous and mean "containing tiny, discrete voids or pores". The labels of the invention include a "voiding agent" dispersed within the polyester matrix. The term "voiding agent", as used herein, is synonomous with the terms "voiding composition", "microvoiding agent", and "cavitation agent" and is understood to mean a substance dispersed within a polymer matrix that is useful to bring about or cause the formation voids within the polymer matrix" upon orientation or stretching of the polymer matrix. The term "polymer matrix", as used herein, is synonymous with the term "matrix polymer" and refers to the polyester or polyester blend that provides a continuous phase in which the voiding again may be dispersed such that the particles of the voiding agent are surrounded and contained by the continuous phase.

Typical voiding agents which may be used include at least one polymer selected from cellulosic polymers, starch, esterified starch, polyketones, polyester, polyamides, polysulfones, polyimides, polycarbonates, olefinic polymers, and copolymers thereof. The term "olefinic polymer", as used herein is intended to mean a polymer resulting from the addition polymerization of ethylenically unsaturated monomers such as, for example, polyethylene, polypropylene, polystyrene, poly(acrylonitrile), poly(acrylamide), acrylic polymers, poly(vinyl acetate), poly(vinyl chloride), and copolymers of these polymers. The voiding agent may also comprise one or more inorganic compounds such as, for example talc, silicon dioxide, titanium dioxide, calcium carbonate, barium sulfate, kaolin, wollastonite, and mica. The voiding agent also may comprise a combination of polymeric and inorganic materials. The polyester film forms voids on orientation or stretching at a temperature at or above the Tg of the polyester matrix. Stretching may be carried out in one or more directions at a stretch or draw ratio of at least 1.5. Thus, as described previously, the composition may be "uniaxially stretched", meaning the polyester is stretched in one direction or "biaxially stretched," meaning the polyester is stretched in two different directions.

The voiding agent may comprise one or more polymers. The voiding agent may be a single polymer or blend of one or more polymers. For example, the voiding agent may comprise at least one polymer selected from cellulosic polymers, starch, esterified starch, polyketones, fluoropolymers, polyacetals, polyesters, polyamides, polysulfones, polyimides, polycarbonates, olefinic polymers, and copolymers of these polymers with other monomers such as, for example, copolymers of ethylene with acrylic acid and its esters. Cellulosic polymers are particularly efficient voiding agents. For example, the voiding agent may comprise a first polymer comprising at least one cellulosic polymer comprising one or more of microcrystalline cellulose, a cellulose ester, or a cellulose ether. In another example, the first polymer may be a cellulose ester such as, for example, cellulose acetate, cellulose triacetate, cellulose acetate propionate, or cellulose acetate butyrate. In yet another example, the first polymer may be a cellulose ether which may include, but is not limited to, one or more of hydroxypropyl cellulose, methyl ethyl cellulose, or carboxymethyl cellulose.

The voiding agent also may comprise a second polymer comprising one or more polymers selected from polyamides, polyketones, polysulfones, fluoropolymers, polyacetals, polyesters, polycarbonates, olefinic polymers, or copolymers thereof. For example, the second polymer may include, but is not limited to, one or more olefinic polymers such as, for example, polyethylene, polystyrene, polypropylene, and copolymers thereof. Further non-limiting examples of olefinic copolymers include ethylene vinyl acetate, ethylene vinyl alcohol copolymer, ethylene methyl acrylate copolymer, ethylene butyl acrylate copolymer, ethylene acrylic acid copolymer, ionomer, or mixtures thereof. Olefinic copolymers such as, for example, ethylene methyl acrylate copolymer (abbreviated herein as "EMAC"), ethylene butyl acrylate (abbreviated herein as "EBAC"), ethylene acrylic acid (abbreviated herein as "EAA") copolymer, maleated, oxidized or carbyoxylated PE, and ionomers may be used advantageously with the cellulosic polymers described above as the second polymer to increase the opacity and improve the overall aesthetics and feel of the film. These olefinic polymers also may aid the compounding and dispersion of the cellulosic. Thus, for example, the second polymer may comprise one or more of EMAC or EBAC. In another embodiment, for example, the voiding agent can comprise a first polymer comprising cellulose acetate, cellulose triacetate, cellulose acetate proprionate, cellulose acetate butyrate, hydroxypropyl cellulose, methyl ethyl cellulose, carboxymethyl cellulose, or mixtures thereof; and a second polymer comprising polyethylene, polystyrene, polypropylene, ethylene vinyl acetate, ethylene vinyl alcohol copolymer, ethylene methyl acrylate copolymer, ethylene butyl acrylate copolymer, ethylene acrylic acid copolymer, ionomer, or mixtures thereof. In another example, the first polymer may comprise one or more of cellulose acetate or cellulose acetate propionate and the second polymer may comprise polystyrene, polypropylene, ethylene methyl acrylate copolymer, or a mixture thereof. In yet another example, the first polymer comprises cellulose acetate, the second polymer comprises polypropylene and ethylene methyl acrylate copolymer.

The polymers that may be used as the first polymer or second polymer, of the voiding agent may be prepared according to methods well-known in the art or obtained commercially. Examples of commercially available polymers which may be used in the invention include EASTAR™, EASTAPAK™, SPECTAR™, and EMBRACE™ polyesters and copolyesters available from Eastman Chemical Co.; LUCITE™ acrylics available from Dupont; TENITE™ cellulose esters available from Eastman Chemical Co.; LEXAN™ (available from Sabic Innovative Plastics) or MAKROLON™ (available from Bayer) polycarbonates; DELRIN™ polyacetals available from Dupont; K-RESIN™ (available from Phillips) and FINACLEAR™/FINACRYSTA™ (available from Atofina) styrenics and styrenic copolymers; FINATHENE™ (available from Atofina) and HIFOR™/TENITE™ (available from Eastman) polyethylenes; ZYTE™ nylons available from Dupont; ULTRAPEK™ PEEK available from BASF; KAPTON™ polyimides available from Dupont; and TEDLAR™ and KYNAR™ fluoropolymers available from Dupont and Atofina, respectively.

The void-containing, polyester label will generally contain about 1 to about 40 weight percent of voiding agent, based on the total weight of the film. Other examples of voiding agent content within the film are about 5 to about 35 weight percent, about 10 to about 35 weight percent, about 15 to about 35 weight percent, and about 15 to about 30 weight percent. Typically, the voiding agent comprises about 5 to about 95 weight percent of the first polymer, based on the total weight of the voiding agent. Other weight percent ranges for the first polymer within the voiding agent are about 30 to about 60 weight percent and about 50 to about 60 weight percent. When the voiding agent comprises a cellulosic polymer and an olefinic polymer, the voiding agent typically will comprise at least 5 weight percent or more of the cellulosic polymer, based on the total weight of the composition. For example, the voiding agent may comprise at least 30 weight percent of the cellulosic polymer. The components of the voiding agent may be compounded together on a mixing device such as, for example, a twin screw extruder, planetary mixer, or Banbury mixer, or the components may be added separately during film formation. Small amounts of inorganic voiding agents may also be included. It may be desirable to precompound the cellulosic polymer and the olefin, in which the olefin may be used as part of the carrier resin in which the cellulosic is dispersed. Precompounding the olefin and the cellulosic polymer provides the added advantage that the olefin serves as a vehicle for dispersing the cellulosic polymer, and provides an efficient moisture barrier to prevent uptake of moisture into the cellulosic polymer prior to final extrusion. In addition, the voiding agent is easier to handle and dry. It is also possible to use blends of polymers as voiding agents as long as sufficient shearing, for example, by the use of a twin screw or high shear single screw extruder, is used to adequately disperse the components of the voiding agent.

As noted above, the hot-melt adhesive composition of the invention can be used for adhering roll-on, shrink labels to a container. Our invention, therefore, also includes a process for applying a roll-on, shrink label to a container, comprising:

I. applying a hot-melt adhesive to one or more locations on a heat-shrinkable label, a container, or a combination thereof, wherein the hot-melt adhesive comprises
   A. about 50 to 100 weight percent, based on the total weight of the adhesive composition, of at least one polyester, comprising (i) diacid residues, comprising about 70 to 100 mole percent, based on the total moles of diacid residues, of the residues of 1,4-cyclohexanedicarboxylic acid, and 0 to about 30 mole percent of the residues of at least one modifying dicarboxylic acid having about 4 to about 40 carbon atoms; and (ii) diol residues, comprising about 70 to about 100 mole percent, based on the total moles of diol residues, of the residues of at least two diols chosen from 1,4-cyclohexane-dimethanol, triethylene glycol, and diethylene glycol, and about 30 to about 0 mole percent of the residues of at least one modifying glycol; and
   B. 0 to about 50 weight percent of a tackifier; plasticizer, wax, nucleator, or combination thereof;
      wherein the polyester has an inherent viscosity of about 0.1 to about 0.4 dL/g as measured at 25° C. using 0.5 grams of polymer per 100 ml of a solvent comprising 60 weight percent phenol and 40 weight % tetrachloroethane, a melting temperature of about 80 to about 130° C., and a heat of melting of about 0.1 cal/g to about 6 cal/g; and
      wherein the adhesive composition has a melt viscosity of about 300 to about 3000 centipoise at 150° C.;
II. affixing the label around the container to produce a labeled container;
III. allowing the applied hot-melt adhesive to at least partially crystallize; and
IV. shrinking the label by exposing the labeled container to heat.

The above process is understood to include the various embodiments described hereinabove for the hot-melt adhesive composition such as, for example, the various embodiments of the polyester, inherent viscosity, heat of melting, plasticizers, waxes, nucleators, and tackifiers in any combination; the container; and the polyester label. For example, the hot-melt adhesive composition can comprise a polyester comprising diacid residues which comprise about 80 to about 100 mole percent of the residues of 1,4-cyclohexanedicarboxylic acid and 0 to about 20 mole percent of the residues of at least one modifying dicarboxylic acid chosen from adipic acid, glutaric acid, and dimer acid; and diol residues comprising about 30 to about 65 mole percent of the residues of 1,4-cyclohexanedimethanol, and about 20 to about 60 mole percent of the residues of triethylene glycol, diethylene glycol, or a combination thereof, and about 0 to about 30 mole percent of the residues of polypropylene glycol.

The hot-melt adhesive can be used to affix the heat shrink labels to the appropriate containers using conventional packaging equipment, as described, for example, in U.S. Pat. Nos. 4,704,173 and 4,844,957. These techniques are particularly useful in the labeling of glass, metal or plastic, cylindrical or multi-faceted containers and can be used for labels prepared from polyesters, polyolefins such as polypropylene or polyethylene, polyvinyl chloride films, or similar plastic sheets.

The hot-melt adhesive can be applied to one or more locations on the heat-shrinkable label by any method known in the art including wipe-on, spray, roller, nozzle, foamed hot melt applicator, high and low pressure applicator, gravure, adhesive gun, wheel, pattern coater, and the like. For example, the hot-melt adhesive can be applied to one or both ends of the label and on one or more surfaces. Alternatively, the adhesive can be applied to one surface of the label and on the container. Other applications can include any method for applying the adhesive to one of two substrates, after which the two are immediately brought together to form an adhesive bond. For example, the label can have the hot melt adhesive applied thereto in a generally vertical line at the leading and trailing edges of the label. The balance of the label is preferably free of adhesive so that the label can shift as it shrinks without causing wrinkling of the label material. Alternately, applications where the hot melt is applied to a substrate via an extrusion coater, doctor blade, slot die coater, and the like, and then laminated to another substrate later via heat activation can be envisioned. The adhesive can be applied at any thickness, with or without a primer, liner or release coating. The adhesive also can be applied in conjunction with other seaming methods. For example, the hot melt adhesive can be used to tack the label to a container for seaming using another method such as, for example, solvent seaming, ultrasonic seaming, or laser seaming.

After applying the adhesive, the label is affixed to the container by any method known in the art. For example, the hot-melt adhesive may be applied to a narrow region of the container or at the leading end of the film segment to secure the leading end of the film to the container, the film wrapped around the container and the film segment secured to the container by overlapping the trailing end, a narrow region of which has been coated with the hot melt adhesive.

During the application of the adhesive, the label may be supported and transported by a rotary vacuum drum, or other label transport mechanisms well known in the art. The leading end of the label is brought into positive or compressive contact with a container, or other article, providing an adhesive bond between the two. The container is thereafter spun about its axis to wrap the full extent of the label around the container.

As the trailing end of the label comes into initial contact with the underlying leading end of the label, a compressive force is applied to the unsupported or free standing seam portion of the label. This force is conveniently provided by pneumatic means, such as a jet of air directed generally outwardly from the axis of the container against the inner wall of the unsupported seam. The wall of the vacuum drum or other label transport apparatus provides a convenient backing against which the pneumatic force can work. Mechanical means, such as a wheel, a finger, or the like could also be substituted for the air jet to apply the necessary compressive forces against the label seam. The application of such compressive force at the critical moment of initial contact between the leading and trailing ends of the label, is effective to maintain the two ends in intimate contact while the seam bond is formed.

Before application to the label, the hot-melt adhesive is melted above the melt temperature ("$T_m$") thereby taking it from a crystalline solid to a liquid. Before application to the shrink label, however, it is desirable to cool the adhesive to reduce the temperature to below the shrink onset temperature of the shrink label while maintaining the adhesive in liquid form.

After the label is affixed to the container, it is allowed to at least partially crystallize before exposing the container to heat to shrink the label. The amount of crystallization can be adjusted, among other things, by the polyester composition, the presence of a nucleator, the application temperature of the hot-melt adhesive, and the duration between the application of the adhesive and commencement of heating of the container in the shrink oven. The adhesive once applied to the substrate will continue to cool and will rapidly begin to crystallize and harden into a high modulus solid. The degree of crystallization can be determined by differential scanning calorimetry by measuring the melting endotherm. Typically, the recrystallization temperature ("$T_{rcry}$") (i.e. either the crystallization temperature that occurs upon cooling, denoted at "$T_{cc}$" or the crystallization temperature that occurs on subsequent heating "$T_{ch}$", whichever occurs first if both are present) will be below the shrink onset temperature, $T_{so}$ (if multiple recrystallization peaks are present, then at least one should be below $T_{so}$). In one embodiment, for example, the recrystallization temperature can be at least 20° C. lower than $T_{so}$.

After the hot-melt adhesive is allowed to at least partially crystallize, the labeled container is exposed to heat to shrink the label. The labeled container is exposed to heat typically by passing the container through a shrink oven or tunnel at a temperature above the shrink onset temperature of the label in accordance with methods well-known in the art. Typical shrink tunnels use steam, hot air, infrared heaters, or a combination of these methods to maintain a temperature of about 80 to about 90° C. A typical residence time for a container in a shrink tunnel will range from about 2 to about 20 seconds.

In addition to the container and film materials that are commonly used in roll-applied, shrink label applications, the adhesive compositions of the invention also can be applied to a number of substrates including aluminum, copper, lead, other metals, and other metalized polymer films, paper, leather, glass, polypropylene, polyethylene, polyvinyl chloride, polyester, cellulosics (cellophane and cellulose acetate), polystyrene, polyurethane, acrylic, polyimide, ultra-high molecular weight polyethylene, polycarbonate, polyvinylalcohol, polyamide, polylactide, styrene-acrylonitrile, acrylonitrile-butadiene-styrene polymer, styrene-butadiene copolymers, polysulfones, polyethersulfones, blends, foam, woven fabric, nonwoven, tissue, and synthetic paper.

Other general application areas include case and carton sealing, corrugated containers, tray sealing, paper laminates, nonwovens (e.g., diapers, sanitary, incontinence, disposable garments, filters & separators), elastic attachments, construction adhesives, bookbinding for books and periodicals, labels, bags, textiles, carpet seaming, furniture (including office partitions and built in furniture), cans, tubes, drums, coated abrasives (sand paper, sanding discs, sanding belts, grinding wheels, etc.), automotive acoustic deadening adhesive, wax-like coatings (water repellant), coatings for packaging, composites, foams, membranes, sponges, primer, hot melt for polyester film to be heat activated by the user at a later time, flexible printed circuit film bonding, stitchless sewing, adhesives to reinforce seams, foot wear, art and hobby, multiwall paper bags, specialty bags, cigarette papers and filters, coextruded tie coats, peelable tops for closures of beverage cans and foods, seam sealed or adhesive bonded containers, inks, flux, wood products (plywood, reconstituted wood board products, hard board, medium density fiber board, particle board, oriented strand board), and glass laminating adhesives.

In one embodiment, for example, the adhesive composition is a 100% recyclable pressure sensitive adhesive comprising a polyester adhesive and a polyester backing. In another embodiment, the adhesives of the invention can be used as modifiers to paints and inks. Yet another embodiment is the use of these adhesives to produce peelable seals for lidding film and related packaging applications.

The invention also includes the following embodiments that are set forth below in paragraphs [0083]-[0103]: a hot-melt, adhesive composition, comprising:

A. about 50 to 100 weight percent, based on the total weight of the adhesive composition, of at least one polyester, comprising (i) diacid residues, comprising about 70 to 100 mole percent, based on the total moles of diacid residues, of the residues of 1,4-cyclohexanedicarboxylic acid, and 0 to about 30 mole percent of the residues of at least one modifying dicarboxylic acid having about 4 to about 40 carbon atoms; and (ii) diol residues, comprising about 70 to about 100 mole percent, based on the total moles of diol residues, of the residues of at least two diols chosen from 1,4-cyclohexanedimethanol, triethylene glycol, and diethylene glycol, and about 30 to about 0 mole percent of the residues of at least one modifying diol; and B. 0 to about 50 weight percent of a tackifier, plasticizer, wax, nucleator, or combination thereof;

wherein the polyester has an inherent viscosity of about 0.1 to about 0.4 dL/g as measured at 25° C. using 0.5 grams of polymer per 100 ml of a solvent comprising 60 weight percent phenol and 40 weight % tetrachloroethane, a melting temperature of about 80 to about 130° C., and a heat of melting of about 0.1 cal/g to about 6 cal/g; and wherein the adhesive composition has a melt viscosity of about 300 to about 3000 centipoise at 150° C.

An adhesive composition that includes the embodiments of paragraph [0083], wherein the modifying dicarboxylic acid comprises succinic acid, glutaric acid, adipic acid, suberic acid, pimelic acid, fumaric acid, maleic acid, itaconic acid, glycolic acid sebacic acid, azelaic acid, dimer acid, terephthalic acid, isophthalic acid, or combinations thereof; and the modifying diol comprises ethylene glycol, 1,2-propanediol, 1,3-propanediol, 1,5-pentanediol, neopentyl glycol, 1,6-hexanediol, 1,8-octanediol, 2,2,4-trimethyl-1,3-pentanediol, polyethylene glycol, polytetramethylene glycol, polypropylene glycol, 2,4-dimethyl-2-ethylhexane-1,3-diol; 2,2,4,4-tetramethyl-1,3-cyclobutanediol, 2,2-dimethyl-1,3-propanediol, 2-ethyl2-butyl-1,3-propanediol, 2-ethyl-2-isobutyl-1,3-propanediol, 1,3-butanediol, 1,5-pentanediol, or combinations thereof.

An adhesive composition that includes the embodiments of paragraph [0084], wherein the diacid residues comprise about 80 to about 100 mole percent of the residues of 1,4-cyclohexanedicarboxylic acid and 0 to about 20 mole percent of the residues of the modifying dicarboxylic acid; and the diol residues comprise 30 to about 65 mole percent of the residues of 1,4-cyclohexanedimethanol; about 20 to about 65 mole percent of the residues of triethylene glycol, diethylene glycol, or a combination thereof; and about 0 to about 30 mole percent of the residues of the polypropylene glycol.

An adhesive composition that includes the embodiments of paragraph [0085], wherein the modifying dicarboxylic acid comprises adipic acid, glutaric acid, dimer acid, or combinations thereof.

An adhesive composition that includes the embodiments of paragraph [0083], wherein the diol residues comprise about 35 to about 65 mole percent of the residues of triethylene glycol and about 20 to about 60 mole percent of the residues of diethylene glycol.

An adhesive composition that includes the embodiments of paragraph [0085], wherein the diacid residues comprise about 90 to about 95 mole percent of the residues of 1,4-cyclohexanedicarboxylic acid and about 5 to about 10 mole percent of the residues of dimer acid; and the diol residues comprise about 40 to about 60 mole percent of the residues of 1,4-cyclohexanedimethanol; about 60 to about 40 mole percent of the residues of triethylene glycol, diethylene glycol, or a combination thereof; and 0 to about 20 mole percent of the residues of polypropylene glycol.

An adhesive composition that includes the embodiments of any one of paragraphs [0083]-[0088], wherein the tackifier comprises a tall oil rosin, gum rosin, wood rosin, hydrogenated rosin, polymerized rosin, disproportionated rosin, aromatic hydrocarbon resin, coumarone-indene resin, polyterpene, terpene-phenolic resin, phenolic resin, maleic resin, ketone resin, polyester resin, or combinations thereof; the plasticizer comprises a benzoate ester, phthalate ester, citrate ester, phosphate ester, terephthalate ester, isophthalate ester, or combinations thereof; the wax comprises stearamide, 12-hydroxystearamide, N-(2-hydroxy ethyl)-12-hydroxystearamide, glycerin monostearate, sorbitan monostearate, 12-hydroxy stearic acid, or combinations thereof; and the nucleator comprises a polyolefin or olefinic ionomer having a melting temperature of about 70 to about 130° C., or a mixture thereof.

An adhesive composition that includes the embodiments of any one of paragraph [0083]-[0089], wherein the tackifier comprises at least one hydrogenated rosin having an acid number of about 145 to about 175 mg KOH/gram of rosin; the plasticizer comprises 1,4-cyclohexanedimethanol dibenzoate, neopentyl glycol dibenzoate, dipropylene glycol dibenzoate, propylene glycol dibenzoate, isodecyl benzoate, alkyl benzoate esters having 7 to 40 carbon atoms, or combinations thereof; and the nucleator comprises polyethylene, polypropylene, olefinic ionomers, or combinations thereof.

An adhesive composition that includes the embodiments of any one of paragraphs [0083]-[0090], which comprises about 50 to about 70 weight percent of the polyester, about 20 to about 40 weight percent of the hydrogenated rosin, and about 5 to about 15 weight percent of a plasticizer comprising 1,4-cyclohexanedimethanol dibenzoate, a wax comprising stearamide, 12-hydroxystearamide, N-(2-hydroxy ethyl)-12-hydroxystearamide or a combination thereof, or a combination of a plasticizer and a wax.

An adhesive composition that includes the embodiments of any one of paragraphs [0083]-[0091], wherein the polyester has a heat of melting of about 0.1 to about 4 cal/g.

A hot-melt adhesive composition comprising;

A. about 90 to 100 weight percent, based on the total weight of the adhesive composition, of the polyester, wherein the polyester comprises (i) diacid residues, comprising about 80 to 100 mole percent, based on the total moles of diacid residues, of the residues of 1,4-cyclohexanedicarboxylic acid, and 0 to about 20 mole percent of the residues of adipic acid, dimer acid, or a mixture thereof; and (ii) diol residues, comprising about 40 to about 60 mole percent, based on the total moles of diol residues, of the residues of 1,4-cyclohexanedimethanol and about 60 to about 40 mole percent of the residues of triethylene glycol, diethylene glycol, or a mixture thereof; and B. 0 to about 5 weight percent of at least one nucleator;

wherein the polyester has an inherent viscosity of about 0.1 to about 0.3 dL/g, a melting temperature of about 80 to about 120° C., and a heat of melting of about 0.1 cal/g to about 4 cal/g.

An adhesive composition that includes the embodiments of paragraph [0093], which comprises about 0.1 to about 5 weight percent of the nucleator, wherein the nucleator comprises a polyolefin, olefinic ionomer, or combinations thereof.

A container, comprising a label adhered thereto with the hot-melt adhesive composition of any one of paragraphs [0083]-[0094]

A container that includes the embodiments of paragraph [0095], wherein the polyester has a heat of melting of about 0.1 to about 4 cal/g and a melting temperature of about 90 to about 120° C.

A container that includes the embodiments of paragraphs [0095] or [0096], wherein the label has at least one layer and comprises a polyester, polyolefin, polyvinylchloride, polylactic acid, paper, metal, or polystyrene film.

A container that includes the embodiments of paragraphs [0095], [0096], or wherein the label is a shrink label.

A container that includes the embodiments of any one of paragraphs [0095]-[0098], wherein the label comprises a polyester film comprising about 90 to about 100 mole percent of the residues of terephthalic acid, based on the total moles of diacid residues; and about 52 to about 88 mole percent of the residues of ethylene glycol, based on the total moles of diol residues, about 10 to about 28 mole percent of the residues of 1,4-cyclohexanedimethanol, and about 2 to about 20 mole percent of the residues of diethylene glycol.

A container that includes the embodiments of any one of paragraphs [0095]-[0099], wherein the label has about 25 to about 85 percent machine direction shrinkage and 0 to about 10 percent transverse direction shrinkage or growth.

A container that includes the embodiments of any one of paragraphs [0095]-[0100], wherein the polyester film further comprises a voiding agent, comprising at least one polymer incompatible with the polyester film and dispersed therein.

A container that includes the embodiments of any one of paragraphs [0095]-[0101] which is a bottle, jar, can, box, or battery casing.

A process for applying a roll-on, shrink label to a container, comprising:
I. applying a hot-melt adhesive that includes the embodiments of paragraphs [0083]-[0094], to one or more locations on a heat-shrinkable label, a container, or a combination thereof;
II. affixing the label around the container to produce a labeled container;
III. allowing the applied hot-melt adhesive to at least partially crystallize; and
IV. shrinking the label by exposing the labeled container to heat.

The invention may be further illustrated by the following examples.

EXAMPLES

The inherent viscosity (IV) values were measured at 25° C. in 60/40 wt/wt phenol/tetrachloroethane. Polymer samples were dissolved in the solvent at a concentration of 0.25 g/50 mL. The viscosity of the polymer solution was determined using a Viscotek Modified Differential Viscometer. A description of the operating principles of the differential viscometers can be found in ASTM Method D 5225.

Melt viscosities were measured in accordance with ASTM Method D3236, *"Apparent Viscosity of Hot Melt Adhesives and Coating Materials,"* using a Brookfield DVII Viscometer equipped with a thermosel and #27 spindle and are shown in Table 1. The measurement temperature was 150° C. using a nominal 12 gram sample. Melt viscosity requirements defined herein are based on the fully formulated adhesive and therefore include the effects of plasticizers, tackifiers, nucleators and other additives.

Melting temperature (Tm), glass transition temperature (Tg), heat of melting ($\Delta$Hm), crystallization temperature upon cooling (Tcc), and crystallization temperature upon heating (Tch) were measured using Differential Scanning Calorimetry (DSC) following ASTM Method D3418 with minor modifications, and are shown in Tables 1 and 2. The sample weight was measured before each measurement and was between about 2 and 5 mg. Both first and second heating scans were performed at a scan rate of 20° C./minute. A cooling scan between the first and second heating was also performed at this same rate in order to determine the presence of a crystallization peak upon cooling (Tcc). Scans were typically performed between about −50° C. and 175° C. to ensure detection of Tg and all melting peaks. Data from the second cool down and second heat are reported in Table 2. If the crystallization peak upon cooling was present, then Tcc was determined as the peak temperature of the crystallization exotherm. Similarly, if crystallization occurred upon the 2nd heating cycle, the value Tch was determined from the peak of this crystallization exotherm. The melting temperature Tm was obtained from the peak temperature of the melting endotherm of the 2nd heat cycle and is reported in Table 1. If multiple melting peaks were present, then the peak value of the endotherm with the highest melt temperature was taken as the melting point as set forth in the claims and Table 1. The absence of crystallization or melting peaks is denoted by "ND" in the Tables.

The sum of the absolute value of the area of the melting endotherms (one or more) was taken as the heat of melting ($\Delta$Hm) and was used as a measure of the effective crystallinity that forms during the heat and cool cycle. The melting endotherm is used as a relative approximation to the amount of crystallinity that forms in the adhesive. Values of the endotherms are typically reported in units of cal/g or J/g.

Laboratory adhesion performance was determined by the following procedure. Samples of each adhesive were made into adhesive sticks, the adhesive melted, and applied with a hot melt adhesive gun. The adhesive gun temperature was controlled to within about 110 to 130° C. to avoid shrinkage of the substrate. Adhesive temperature was measured and controlled in the gun by placing a thermocouple into the end of the barrel and controlling the power input with a rheostat. Two film sample strips nominally 1 inch wide, 2 mils thick, and about 4 inches long were bonded together in a lap shear joint using the adhesive.

A brass template was used in order to apply a controlled width and thickness of adhesive. The template was nominally 5 mils thick, and had a 5 mm wide strip cut out of the middle. The template was placed over the edge of one of the film strips, adhesive applied to an edge of the template, and then a razor blade was used to spread the melted adhesive across the whole strip and onto a controlled section of the film. The template was then rapidly removed, leaving a 5 mm wide adhesive bead that was nominally about 3 to 5 mils thick. After application, the edge of the second film strip was placed over the adhesive bead and a joint formed. To ensure uniform contact, a roller was run over the joint with light pressure to ensure uniform contact between the adhesive and the two film substrates. Total time between adhesive application and rolling was about 2 to 4 seconds.

During adhesive application, some of the adhesives crystallized too rapidly to permit a good bond. These were deemed as unsatisfactory. Adhesives that applied smoothly, maintained good tack and had good initial strength were deemed satisfactory depending on the relative level of performance. To test adhesive strength at shrink tunnel temperatures, both ends of the bonded film were tacked to a wooden board to restrain the film, and the whole structure then was placed in either a steam pot, or run through a laboratory hot air shrink tunnel. The steam pot had a nominal temperature of about 90 to 95° C. The time to failure, and the relative mode of failure (e.g. bond peeling, adhesive melting) were used to assess the bond strength. The adhesives, typically, would fail by the shrink label pulling the adhesive bond apart, or by the adhesive melting and coming loose. Failure times in the steam pot ranged from just a few seconds to 20 seconds or more.

While the steam pot gave a good preliminary adhesive assessment, many of the samples were also tested using a hot air shrink tunnel set at about 97° C. (205° F.). The support board and film sample were passed through the hot air tunnel which had a residence time of about 8 to 10 seconds. This test gave a better comparison of bond performance to adhesive labeling experiments that were performed on commercial scale equipment. Both tests, as well as adhesion trial in a commercial infrared shrink tunnel were used to evaluate overall high temperature bond performance.

Two principle film substrates were used for almost all of the film testing. The first was an MD stretched clear copolyester shrink film having 50% ultimate shrinkage and a shrink force of 4 MPa. The film was made from a copolyester based on terepthalic acid and ethylene glycol modified with 22 mole % of cyclohexanedimethanol and 12 mole % of diethylene glycol and is denoted as "PETG" in the tables. The second was a microvoided shrink film also having 50% ultimate shrinkage and 4 MPa shrink force. It was produced by MD stretching a 75/25 blend of the above copolyester with a voiding concentrate consisting of 50 wt % cellulose acetate, 40 wt % polypropylene and 10 wt % ethylene methyl acrylate copolymer, and is denoted by "void" in the data tables. The microvoided film was opaque and had a density of ca. 0.89 g/cc, making it separable in a traditional recycle/flakewash process. Both films were nominally 2 mils (50 microns) thick and have a shrink onset temperature of approximately 70° C.

Example 1

Preparation of Polyester Hot Melt Adhesive

A 500 ml round bottom flask equipped with a ground glass head, 304 SS single blade agitator shaft, nitrogen inlet, and a sidearm was charged with 100 grams (0.5 moles) of 95% trans isomer of dimethyl-1,4-cyclohexanedicarboxylate, 106 grams (1.0 moles) diethylene glycol, 30 grams (0.21 moles) of 60% trans 1,4-cyclohexanedimethanol, and 0.66 ml of a 0.98% (w/v) solution of titanium(IV)isopropoxide in n-butanol. The flask was purged and evacuated 2 times with nitrogen before immersion in a Belmont metal bath at 200° C. where the transesterification was allowed to proceed with evolution of methanol under a 0.2 standard cubic feet per hour (scfm) nitrogen sweep for 75 minutes and an additional 40 minutes at 220° C. with agitation at 200 rpm. After increasing the temperature to 250° C., the nitrogen sweep was stopped and a vacuum of 2 mm was instituted for 24 minutes to perform the polycondensation. The vacuum was then displaced with nitrogen and the flask was removed from the metal bath to discharge the molten polymer into a release-lined carton. The clear polymer melt crystallized upon standing. NMR analysis indicated a final composition consisting of 100 mole percent 1,4-cyclohexanedicarboxylate residues, 63 mole percent diethylene glycol residues, and 37 mole percent 1,4-cyclohexanedimethanol residues. An inherent viscosity of 0.233 dl/g was determined at a concentration of 0.5 g/100 ml in 60/40 phenol/tetrachloroethane solvent. Thermal analysis by differential scanning calorimetry (DSC) provided a Tg of −4 C (2nd scan) and melting point of 102° C. A melt viscosity of 1527 cp was recorded at 150° C. for a 12 gram sample by a Brookfield DVII viscometer equipped with a thermosel and #27 spindle. This sample is listed as Example 1 in Tables 1-3. Although not tested for adhesion performance, the following additional lab synthesis descriptions are provided to further illustrate typical methods used for making these adhesives.

Example 1B

Preparation of Polyester Hot Melt Adhesive

The same apparatus and procedure described for Example 1 were used for a monomer charge consisting of 100 grams (0.5 moles) of trans dimethyl-1,4-cyclohexanedicarboxylate, 66 grams (0.44 moles) triethylene glycol, 32 grams (0.22 moles) 1,4-cyclohexanedimethanol, and 0.72 ml of a 0.98% (w/v) solution of titanium(IV) isopropoxide in n-butanol. The recovered polymer melt was clear, water-white and crystallized upon standing for approximately 45 minutes into translucent, malleable solid. An inherent viscosity of 0.229 and a melt viscosity of 848 cp @ 150° C. were determined. Thermal analysis yielded values of −21° C. and 100° C. for the glass transition temperature and melting point, respectively. The heat of melting was 2.3 cal/g. NMR results are not available due to an error in sample dissolution.

Example 1C

Preparation of Polyester Hot Melt Adhesive

The same apparatus and procedure described for Example 1 were used for a monomer charge consisting of 90 grams (0.45 moles) of trans dimethyl-1,4-cyclohexanedicarboxylate, 25 grams (0.05 moles) PRIPOL™ 1009 dimer acid, 45 grams (0.30 moles) triethylene glycol, 45 grams (0.31 moles) 1,4-cyclohexanedimethanol, and 0.81 ml of a 0.98% (w/v) solution of titanium(IV)isopropoxide in n-butanol. The recovered polymer melt was clear, water-white and crystallized upon standing for approximately 30 minutes into an opaque white, slightly malleable solid. The polyester had an inherent viscosity of 0.246 and a melt viscosity of 2600 cp @ 150° C. Thermal analysis yielded values of −28° C. and 113° C. for the glass transition temperature and melting point, respectively. The heat of melting was 5.7 cal/g. NMR analysis indicated a final polymer comprised of 89 mole percent 1,4-cyclohexanedicarboxylate residues, 11 mole percent PRIPOL™ 1009 dimer acid residues, 58 mole percent 1,4-cyclohexane dimethanol residues and 42 mole percent triethylene glycol residues.

COMPARATIVE EXAMPLE

Preparation of Hot Melt Polyester

This comparative example illustrates the preparation of a polyester having high rate of crystallization and high melt viscosity. The same apparatus and procedure described for Example 1 were used except the polycondensation was extended to 25 minutes for a monomer charge consisting of 100 grams (0.5 moles) of trans dimethyl-1,4-cyclohexanedicarboxylate, 106 grams (1.0 moles) diethylene glycol, 46 grams (0.32 moles) 1,4-cyclohexanedimethanol, and 0.68 ml of a 0.98% (w/v) solution of titanium(IV)isopropoxide in n-butanol. The recovered polymer melt was clear, water-white and rapidly crystallized upon standing for less than 10 minutes into white, crystalline solid. The polyester had an inherent viscosity of 0.245 and a melt viscosity of 4100 cp @ 150° C. DSC analysis gave a glass transition temperature of 60° C., a melting point of 109° C., and a heat of melting of 3.6 cal/g. NMR analysis indicated a final polymer composition comprising 100 mole percent 1,4-cyclohexanedicarboxylate residues, 58 mole percent diethylene glycol residues, and 42 mole percent 1,4-cyclohexanedimethanol residues.

Comparative Examples C1 through C21

Adhesive Testing with Neat Adhesive Samples

Comparative examples C1 through C21 were prepared using the same procedure as described above for Example 1. These polyesters did not provide satisfactory adhesion performance for a variety of reasons. These comparative samples were quantified using DSC, melt viscosity testing and the results are shown in Tables 1 and 2. In these tables, the mole percentages of the diacid and diol components are shown and are based on 100 mole % total of acids, and 100 mole % total of diols. Viscosities are given in units of centipoise, inherent viscosities are in units of dl/g, and temperatures are in units of degrees Celsius. The melt viscosities for Comparative Examples C1-C7 were not measured and are indicated as not available ("n/a") in Table 1. The following abbreviations are used in Tables 1-3 for the various diacid and diols monomers:

| Diols | Diacids |
| --- | --- |
| EG = ethylene glycol | T = terephthalic acid |
| DEG = diethylene glycol | I = isophthalic acid |
| TEG = triethylene glycol | SA = succinic acid |
| HD = 1,6-hexanediol | GA = glutaric acid |
| BD = 1,4-butanediol | CHDA = 1,4-cyclohexane-dicarboxylic acid |
| CHDM = 1,4-cyclohexane-dimethanol | AA = adipic acid |
| PPG-1000 = polypropylene glycol, 1000 MW | DA = dimer acid 36 |
| ND = none detected | |

Adhesion testing was performed, where possible, via hot melt adhesive gun testing. The comparative examples listed in Table 1 through 3 were difficult to bond showed poor bond strength under shrink testing, were too viscous, and/or had a melting temperature that was too high. Samples listed as "poor" in Table 3 performed inadequately and would not be acceptable for any type of RAS or general adhesive application. Samples listed as "fair" exhibited better viscosity, melting temperature, and bond strength properties, but were not judged to be functional adhesives. In contrast, adhesives listed as "excellent" are expected to perform well in RAS applications whereas samples listed as "good" are expected to perform well as general purpose adhesives, and for general RAS applications with films having low shrinkage or lower shrink onset temperatures.

With regards to specific reasons for failure, some of Comparative Examples (for example, C1 and C2, C4-C7, etc.) were poor performers because they crystallized too quickly to process into strong adhesive bonds. The adhesive formed unacceptably brittle bonds in the few instances where a bond could be formed.

Other Comparative Examples such as C8, and C9 applied well, but showed no discernible crystallinity, had low melt strength during shrinkage testing, and the adhesive bond failed in the shrink tunnel. In contrast, Samples C10 through C15 had excessively high melt viscosities (>3000 cP at 150° C.) and could not sufficiently softened to enable uniform application. Comparative Example C18 bonded well but did not have sufficient thermal resistance and the bond failed quickly under heat. Sample C19 could not be sufficiently melted at a cool enough temperature, and tended to curl the shrink film when applied.

Examples 1 through 14

Adhesive Testing with Neat Adhesives

Neat polyester adhesives that exhibited satisfactory performance as a RAS label adhesive or general purpose adhesive are shown in Table 1 through 3. All of these samples are neat and do not contain any plasticizers or modifiers. As with the Comparative Examples above, the samples were applied to polyester film strips using an adhesive gun and a template. Sample performance during application and subsequent shrink tunnel testing was assessed.

In general, all of the samples were produced good bonds that survived the shrink tunnel test described above. Samples 2, and 4 through 8 showed excellent performance. Strong label bonds were formed that would survive the shrink tunnel while maintaining toughness.

Samples 9 and 10 produced good tacky bonds but had a lower melt temperature and would be excellent adhesives for a RAS film with a lower shrink onset temperature (70° C. or less).

Examples 15-19 and Comparative Examples 22 and 23

Commercial Labeling Trial

Selected adhesives were produced on pilot plant scale and then tested on a Krones Contiroll HS™ roll-fed labeling system equipped with an infrared shrink tunnel manufactured by OAL. Adhesives were applied to both PETG and voided films that had been printed with a test pattern and necessary indexing marks. The labels were applied to a straight wall 20 oz. PET container to verify general adhesive performance. For all of the tests, the pot temperature was set at 132 to 140° C. (270 to 285° F.) as this was the maximum temperature before label curling would occur. The applicator was nominally about 6° C. (10° F.) cooler than the pot temperature, and the substrate helped to cool the adhesive even further upon application to the label. All of the adhesives chosen for this trial were found to have good initial tack. Most, in fact, had a somewhat "pressure sensitive" type behavior which made them function better over a wide range of adhesive application rates and line speeds.

Labeling rates from about 100 to 300 bottles per minute were used for the tests. For many of the adhesives, higher rates could have been applied, but only a limited number of bottles were available so runs had to be kept short. The shrink tunnel was set between about 149 and 177° C. (300 and 350° F.) and had a residence time of about 6 seconds. Specific details of some of the adhesive performance will now be given.

Comparative Example 22 was EUROMELT™ 362, an adhesive based on a styrenic block copolymer manufactured by Henkel Adhesives. It is a commonly used hot melt for roll-fed and some RAS type labels (particularly polypropylene RAS labels). This adhesive applied well with excellent green strength and tack, but would not survive the shrink tunnel set at 165° C. (329° F.). The adhesive melted and the seam pulled apart even at cooler tunnel temperatures for both the PETG and voided films.

Comparative Example 23 was a neat polyester with a melt viscosity at 150° C. of 1020 cP. This adhesive exhibited good initial tack, but did not survive passage through the shrink tunnel. For the voided substrate, the label to bottle seam appeared to be stronger than the label to label bond.

Example 15 was a neat copolyester produced from 1,4 cyclohexane dicarboxylic acid (CHDA) with 58 mole % triethylene glycol and 42 mole % cyclohexane dimethanol (CHDM). The composition was similar to Example 6 except the melt viscosity at 150° C. was 655 cP. Both the PETG and voided films survived the heat tunnel at 165° C. (329° F.) producing a smooth label with good toughness. Furthermore, this adhesive produced excellent labels even when wet bottles were sent through the labeler.

Example 16 was a neat copolyester produced similar to Example 4, but with a melt viscosity of 847 cP at 130° C. It produced a good seam that survived the shrink tunnel for both the voided and PETG films.

Example 17 was an identical composition to Example 16, except the melt viscosity was 1657 cP at 150° C. Label quality was acceptable for both substrates after going through the shrink tunnel at 177° C. (350° F.). The viscosity of this adhesive was high but acceptable. The addition of 10 wt % BENZOFLEX™ 352 plasticizer (Velsicol Corp.) helped to reduce the viscosity into a more acceptable range.

Example 18 was a formulated adhesive with the base polymer identical to Example 7. The composition was formulated with 30 wt % FORAL™ AX-E hydrogenated gum rosin, and 10% Benzoflex 352 plasticizer to reduce the viscosity to less than 1000 cP at 150° C. It produced label seams having excellent tack, initial or "green" strength, and shrink tunnel performance to both substrates. The adhesive had a pressure sensitive type feel, and also worked with wet bottles.

Example 19 is a formulated adhesive identical to Example 18 except that the diethylene glycol comonomer in the base polymer was replaced by triethylene glycol. Performance was otherwise similar to Example 18.

TABLE 1

Data for Neat Polyester Adhesive Samples

| Ex | Acids (mole %) | Glycols (mole %) | Tm (° C.) | ΔHm (cal/g) | IV (dl/g) | Visc. (cP) |
|---|---|---|---|---|---|---|
| C1 | SA (100) | BD (100) | 115 | 13.5 | 1.44 | n/a |
| C2 | SA (100) | HD (100) | 62 | 13.1 | 1.25 | n/a |
| C3 | AA (100) | EG (100) | 49 | 8.7 | 0.83 | n/a |
| C4 | AA (100) | BD (100) | 62 | 15.7 | 0.96 | n/a |
| C5 | SA (100) | BD (100) | 116 | 15.7 | 0.51 | n/a |
| C6 | SA (100) | BD (90)/EG (10) | 114 | 14.5 | 1.43 | n/a |
| C7 | SA (75)/AA (25) | BD (100) | 89 | 10.9 | 1.10 | n/a |
| C8 | CHDA (100) | DEG (80)/CHDM (20) | ND | ND | 0.28 | 2170 |
| C9 | CHDA (100) | DEG (60)/CHDM (40) | ND | ND | 0.36 | 14800 |
| C10 | AA (100) | CHDM (80)/DEG (20) | 70 | 2.5 | 0.66 | 46200 |
| C11 | CHDA (100) | DEG (60)/CHDM (40) | ND | ND | 0.34 | 8437 |
| C12 | CHDA (100) | DEG (70)/CHDM (30) | ND | ND | 0.38 | 12570 |
| C13 | T (100) | HD (80)/BD (20) | 126 | 9.2 | 0.40 | 33930 |
| C14 | AA (100) | CHDM (60)/DEG (40) | ND | ND | 0.59 | 13070 |
| C15 | GA (100) | CHDM (80)/DEG (20) | ND | ND | 0.47 | 10800 |
| C16 | CHDA (100) | DEG (60)/CHDM (40) | ND | ND | 0.31 | 2755 |
| C17 | CHDA (100) | DEG (80)/CHDM (20) | ND | ND | 0.40 | 10100 |
| C18 | AA (50)/CHDA (50) | DEG (60)/CHDM (40) | ND | ND | 0.37 | 3440 |
| C19 | AA (50)/T (50) | BD (100) | 135 | 5.6 | 0.29 | 2097 |
| C20 | AA (50)/T (40)/I (10) | BD (100) | 95 | 6.3 | 0.27 | 1217 |
| C21 | AA (45)/T (45)/GA (10) | BD (100) | 113 | 6.2 | 0.27 | 1050 |
| 1 | CHDA (100) | DEG (63)/CHDM (37) | 102 | 0.7 | 0.23 | 1527 |
| 2 | CHDA (100) | TEG (60)/CHDM (40) | 87 | 2.3 | 0.28 | 2045 |
| 3 | CHDA (100) | CHDM (50)/DEG (25)/TEG (25) | 95 | 1.5 | 0.23 | 1292 |
| 4 | CHDA (80)/AA (20) | TEG (55)/CHDM (45) | 91 | 1.6 | 0.26 | 1042 |
| 5 | CHDA (100) | CHDM (55)/DEG (40)/PPG-1000 (5) | 107 | 2.2 | 0.26 | 1585 |
| 6 | CHDA (100) | TEG (58)/CHDM (42) | 110 | 0.9 | 0.23 | 847 |
| 7 | CHDA (90)/DA (10) | CHDM (60)/DEG (40) | 114 | 1.7 | 0.26 | 2435 |
| 8 | CHDA (85)/AA (15) | TEG (55)/CHDM (45) | 100 | 2.8 | 0.30 | 1737 |
| 9 | CHDA (100) | TEG (56)/CHDM (44) | 105 | 2.6 | 0.24 | 958 |
| 10 | CHDA (100) | TEG (54)/CHDM (46) | 100 | 3.7 | 0.24 | 975 |
| 11 | CHDA (93)/DA (7) | TEG (48)/CHDM (52) | 109 | 3.2 | 0.27 | 2870 |
| 12 | CHDA (90)/AA (10) | DEG (50)/CHDM (50) | 96 | 1.1 | 0.26 | 1937 |
| 13 | CHDA (80)/AA (20) | DEG (50)/CHDM (50) | 105 | 0.3 | 0.29 | 2685 |
| 14 | CHDA (100) | DEG (50)/CHDM (50) | 105 | 2.5 | 0.23 | 1995 |

TABLE 2

Glass Transition and Crystallization Temperatures

| Ex | Acids (mole %) | Glycols (mole %) | Tg (° C.) | Tcc (° C.) | Tch (° C.) |
|---|---|---|---|---|---|
| C1 | SA (100) | BD (100) | 66 | 69 | 98 |
| C2 | SA (100) | HD (100) | ND | 17 | ND |
| C3 | AA (100) | EG (100) | −42 | 13 | 18 |
| C4 | AA (100) | BD (100) | nd | 25 | ND |
| C5 | SA (100) | BD (100) | 19 | 63 | 86 |
| C6 | SA (100) | BD (90)/EG (10) | ND | 59 | 94 |
| C7 | SA (75)/AA (25) | BD (100) | −44 | 24 | −6 |
| C8 | CHDA (100) | DEG (80)/CHDM (20) | −3 | ND | ND |
| C9 | CHDA (100) | DEG (60)/CHDM (40) | 5 | ND | ND |

TABLE 2-continued

Glass Transition and Crystallization Temperatures

| Ex | Acids (mole %) | Glycols (mole %) | Tg (°C.) | Tcc (°C.) | Tch (°C.) |
|---|---|---|---|---|---|
| C10 | AA (100) | CHDM (80)/DEG (20) | −34 | ND | 36 |
| C11 | CHDA (100) | DEG (60)/CHDM (40) | 4 | ND | ND |
| C12 | CHDA (100) | DEG (70)/CHDM (30) | −1 | ND | ND |
| C13 | T (100) | HD (80)/BD (20) | 15 | 78 | ND |
| C14 | AA (100) | CHDM (60)/DEG (40) | −39 | ND | ND |
| C15 | GA (100) | CHDM (80)/DEG (20) | −32 | ND | ND |
| C16 | CHDA (100) | DEG (60)/CHDM (40) | −6 | ND | ND |
| C17 | CHDA (100) | DEG (80)/CHDM (20) | −2 | ND | ND |
| C18 | AA (50)/CHDA (50) | DEG (60)/CHDM (40) | −26 | ND | ND |
| C19 | AA (50)/T (50) | BD (100) | −37 | 87 | ND |
| C20 | AA (50)/T (40)/I (10) | BD (100) | −38 | 33 | ND |
| C21 | AA (45)/T (45)/GA (10) | BD (100) | −41 | 65 | ND |
| 1 | CHDA (100) | DEG (63)/CHDM (37) | −4 | ND | ND |
| 2 | CHDA (100) | TEG (60)/CHDM (40) | −15 | ND | 47 |
| 3 | CHDA (100) | CHDM (50)/DEG (25)/TEG (25) | −7 | ND | 64 |
| 4 | CHDA (80)/AA (20) | TEG (55)/CHDM (45) | −25 | 69 | 34 |
| 5 | CHDA (100) | CHDM (55)/DEG (40)/PPG-1000 (5) | −23 | ND | 43 |
| 6 | CHDA (100) | TEG (58)/CHDM (42) | −21 | 80 | 31 |
| 7 | CHDA (90)/DA (10) | CHDM (60)/DEG (40) | −11 | ND | 57 |
| 8 | CHDA (85)/AA (15) | TEG (55)/CHDM (45) | −22 | ND | 34 |
| 9 | CHDA (100) | TEG (56)/CHDM (44) | −24 | 65 | ND |
| 10 | CHDA (100) | TEG (54)/CHDM (46) | −22 | 60 | ND |
| 11 | CHDA (93)/DA (7) | TEG (48)/CHDM (52) | −23 | 95 | ND |
| 12 | CHDA (90)/AA (10) | DEG (50)/CHDM (50) | −7 | ND | 65 |
| 13 | CHDA (80)/AA (20) | DEG (50)/CHDM (50) | −10 | ND | 67 |
| 14 | CHDA (100) | DEG (50)/CHDM (50) | 3 | ND | 71 |

TABLE 3

Qualitative Bond Performance

| Ex | Acids (mole %) | Glycols (mole %) | Bond Quality | Comments |
|---|---|---|---|---|
| C1 | SA (100) | BD (100) | poor | too crystalline/brittle |
| C2 | SA (100) | HD (100) | poor | too crystalline/brittle |
| C3 | AA (100) | EG (100) | poor | low melting |
| C4 | AA (100) | BD (100) | poor | too crystalline/brittle |
| C5 | SA (100) | BD (100) | poor | too crystalline/brittle |
| C6 | SA (100) | BD (90)/EG (10) | poor | too crystalline/brittle |
| C7 | SA (75)/AA (25) | BD (100) | poor | too crystalline/brittle |
| C8 | CHDA (100) | DEG (80)/CHDM (20) | poor | poor heat resistance |
| C9 | CHDA (100) | DEG (60)/CHDM (40) | poor | poor heat resistance |
| C10 | AA (100) | CHDM (80)/DEG (20) | poor | too viscous |
| C11 | CHDA (100) | DEG (60)/CHDM (40) | poor | too viscous |
| C12 | CHDA (100) | DEG (70)/CHDM (30) | poor | too viscous |
| C13 | T (100) | HD (80)/BD (20) | poor | too viscous |
| C14 | AA (100) | CHDM (60)/DEG (40) | poor | too viscous |
| C15 | GA (100) | CHDM (80)/DEG (20) | poor | too viscous |
| C16 | CHDA (100) | DEG (60)/CHDM (40) | fair | poor heat resistance |
| C17 | CHDA (100) | DEG (80)/CHDM (20) | poor | too viscous, poor heat resistance |
| C18 | AA (50)/CHDA (50) | DEG (60)/CHDM (40) | fair | poor heat resistance |
| C19 | AA (50)/T (50) | BD (100) | poor | melt temp too high, curled film |
| C20 | AA (50)/T (40)/I (10) | BD (100) | fair | too crystalline/brittle |
| C21 | AA (45)/T (45)/GA (10) | BD (100) | fair | too crystalline/brittle |
| 1 | CHDA (100) | DEG (63)/CHDM (37) | good | |
| 2 | CHDA (100) | TEG (60)/CHDM (40) | excellent | |
| 3 | CHDA (100) | CHDM (50)/DEG (25)/TEG (25) | good | |
| 4 | CHDA (80)/AA (20) | TEG (55)/CHDM (45) | excellent | |
| 5 | CHDA (100) | CHDM (55)/DEG (40)/PPG-1000 (5) | excellent | |
| 6 | CHDA (100) | TEG (58)/CHDM (42) | good | |
| 7 | CHDA (90)/DA (10) | CHDM (60)/DEG (40) | excellent | |
| 8 | 85/15 CHDA (85)/AA (15) | TEG (55)/CHDM (45) | excellent | |
| 9 | CHDA (100) | TEG (56)/CHDM (44) | good | |
| 10 | CHDA (100) | TEG (54)/CHDM (46) | good | |
| 11 | CHDA (93)/DA (7) | TEG (48)/CHDM (52) | good | |
| 12 | CHDA (90)/AA (10) | DEG (50)/CHDM (50) | excellent | |
| 13 | CHDA (80)/AA (20) | DEG (50)/CHDM (50) | good | |
| 14 | CHDA (100) | DEG (50)/CHDM (50) | excellent | |

Examples 20-25

Addition of Nucleators

Neat sample 9 was modified with various nucleators to enhance the rate of crystallinity formation and to improve the bond strength. The nucleator was melt blended with the resin and applied to make a bond to a 1 inch wide film "PETG" strip as described previously (although in this case a 10 mm wide bond strip was made to more accurately reproduce commercial label seams).

For this example, a more sensitive (and severe) test procedure was also developed to better ascertain the adhesive bond's temperature resistance. The adhesive test strip was mounted in test grips of an Oakland Series 500 shrink force tester and a Sentinel 3483 programmable heat gun was used as the heat source (the heat gun is adjustable in 10° F. (5° C.) increments). Surrounding the film strip is a 2 inch diameter PVC pipe to serve as a temperature chamber (the pipe is open at the top and bottom to allow the film to be attached to the shrink force tester). The air enters the pipe through a "tee" directly adjacent to the adhesive bond, and is then forced to turn 90 degrees up or down before exiting the pipe ends.

This configuration provided much more accurate temperature control than just blowing the air directly onto the film. Film bond strength was then tested at different temperatures to determine whether the bond would hold, as well as the force being exerted on the bond from film shrinkage.

Example 20 was the control sample and consisted of the neat sample 9 with no additives. This sample was able to withstand a set temperature of 93° C. (this corresponded to a measured chamber temperature of about 83-85° C.) without failure. At 99° C. set temperature (ca. 88-90° C. actual chamber temperature), the adhesive bond pulled apart almost immediately. By pre-annealing the film at 75° C. for 10 seconds before testing, the bond did not break, but did show considerable slippage. The film also appeared to be slightly more hazy, indicating additional crystal formation.

Example 21 consisted of the same base polymer with a 1 wt % loading of Honeywell polyolefin homopolymer AC 820 (melting point=126° C., viscosity=80 cP @140° C.). As made, the film was able to hold for about 2 seconds at a 99° C. (210° F.) set temperature. By pre-annealing for 10 seconds at 75° C., the film survived for >30 seconds with only moderate slippage. The nucleator increased the appearance of crystalline haze in the bond without annealing.

Example 22 was the same as 21, except 2% of the nucleator was used. In the unannealed state, this film would survive 99° C. set point for 4 seconds before failing. After annealing, it survived for >30 seconds with only slight shrinkage.

Example 23 consisted of 1 wt % of Honeywell 9A polyethylene homopolymer (Tm=115° C., viscosity=450 cP @140° C.). Without annealing, this sample held for >30 seconds but with significant slippage of the bond. After annealing, the sample held >30 seconds with minimal slippage.

Example 24 consisted of 1 wt % of ACLYN™ 285 sodium ionomer (Tm=82° C., viscosity=80,000 cP at 190° C.). While it showed some improvement, it was only slightly better than the neat control.

Example 25 consisted of 1 wt % of ACLYN™ 286 zinc ionomer (Tm=99° C., viscosity=4400 cP @190° C.). This nucleator performed better than the sodium ionomer but not quite as well as the olefin homopolymers above. The unannealed film was able to survive >30 seconds at 99° C. (210° F.) set temperature but had significant shrinkage. After annealing for 10 seconds at 75° C., the performance was only slightly better than the unannealed sample.

Examples 26-52 and Comparative Examples 24-26

Film Adhesion Test with and without Tackifiers

In these examples, a series of polyester adhesives were tested with and without plasticizer/tackifier. The neat resins tested represent copolyesters having different ratios of 1,4-cyclohexanedimethanol and triethylene glycol at different viscosities. Samples were run either neat, with 7 weight % FORAL™ AX-E tackifier, or with 7 weight % KRYSTALEX™ 3100 hydrocarbon resin tackifier (Eastman Chemical). One inch wide film strips from the "PETG" shrink film were bonded together as described previously, and tested for bond strength both inside and outside a simulated shrink tunnel test fixture. The mole percent of CHDM is shown in Table 4; the remaining glycol component was triethylene glycol.

In order to test "green" (i.e., initial) tack, the adhered film strips were mounted into a THELLER™ mini film tester used normally for evaluating heat seal bond strengths. The ends of the film were clamped, and one end then pulled in tensile mode at a strain rate of approximately ¼ inch per second at room temperature. The maximum load at failure (in lbs) was then reported. For the green tack testing, the bond strength was measured within 30 seconds of the adhesive bond being formed (and is denoted the "30 second" test). Additional tests were performed after 1 hr, and after annealing the sample for 10 seconds at 80° C. in a hot air oven. The latter test was performed to simulate the effects of shrink tunnel exposure on the adhesive and to determine if there was any heat induced bond weakening. All results are the average of two tests.

To test bond strengths under high temperature exposure, the film strips were mounted and tested using the heat gun and modified temperature chamber described in Example 20. Samples were initially exposed 10 seconds at 80° C. to "preheat" and anneal the film sample, and also to allow the heat gun to get up into the approximate temperature range. After 10 seconds, the heat gun was switched to 99° C. (210° F.) and the time to bond failure then measured. Because there was a slight time lag between switching the temperature, and actually reaching the target temperature, the time to failure was determined based on the initial onset of film shrinkage. Because the film was mounted in a tensile tester with force gauges, it was possible to determine both the onset of shrinkage (or shrink force) and the point where the bond failed. The latter was determined based on where the shrink force fell off rapidly.

Results for these tests are shown in Table 4 with viscosity, melting point, and heat of melting data. The time that it takes for bond failure at 99° C. (210° F.) can be a good indicator of the survivability of the adhesive in a shrink tunnel under the conditions noted above. Typical tunnel residence times are nominally about 5 to 7 seconds.

All of the samples except Comparative Examples C24-C26 were found to make good hot melt adhesives. The melting temperatures of Comparative Examples C24 through C26 were too high and these adhesives were difficult to apply a bond.

TABLE 4

Bond Strength Data

| Ex. | CHDM (mole %) | Additive (wt %) | Visc. (cP) | Tm (° C.) | ΔHm (cal/g) | 30 s Bond Str (lbs) | 1 hr Bond Str (lbs) | Annealed Bond Str (lbs) | Time to Failure @ 99° C. (secs) |
|---|---|---|---|---|---|---|---|---|---|
| 26 | 46.2 | neat | 460 | 128 | 4.2 | 3.2 | 7.2 | 4.2 | 11.5 |
| 27 | 46.2 | 7% KRYST | 478 | 124.4 | 3.6 | 20.5 | 23.9 | 21.1 | 9.0 |
| 28 | 46.2 | 7% FORAL | 400 | 118.3 | 3.1 | 17.5 | 19.8 | 22.8 | 5.5 |
| 29 | 46.5 | neat | 1625 | 118.3 | 4.6 | 10.0 | 12.9 | 16.2 | 7.0 |
| 30 | 46.5 | 7% KRYST | 1387 | 120.9 | 2.8 | 23.5 | 22.2 | 22.3 | 12.5 |
| 31 | 46.5 | 7% FORAL | 1137 | 124.3 | 2.9 | 20.0 | 23.1 | 22.7 | 15.5 |
| 32 | 45.6 | neat | 713 | 120.6 | 4.3 | 17.5 | 18.8 | 21.0 | 10.0 |
| 33 | 45.6 | 7% KRYST | 675 | 119.6 | 2.8 | 20.4 | 21.5 | 20.1 | 9.0 |
| 34 | 45.6 | 7% FORAL | 548 | 115.5 | 3.2 | 15.9 | 17.6 | 15.1 | 4.0 |
| 35 | 44.3 | neat | 1215 | 122.5 | 4.1 | 8.1 | 11.4 | 20.6 | 14.5 |
| 36 | 44.3 | 7% KRYST | 1085 | 114.2 | 2.5 | 21.1 | 23.5 | 22.4 | 10.5 |
| 37 | 44.3 | 7% FORAL | 808 | 118.5 | 2.8 | 19.6 | 20.1 | 21.4 | 8.0 |
| 38 | 46.4 | neat | 665 | 126.3 | 4.5 | 6.7 | 20.5 | 17.6 | 7.5 |
| 39 | 46.4 | 7% KRYST | 660 | 120.1 | 3.0 | 21.2 | 22.4 | 19.8 | 14.5 |
| 40 | 46.4 | 7% FORAL | 545 | 119.0 | 3.0 | 19.7 | 23.9 | 17.3 | 1.5 |
| 41 | 46.4 | neat | 375 | 122.9 | 3.6 | 13.9 | 13.8 | 14.3 | 9.5 |
| 42 | 44.9 | 7% KRYSTL | 370 | 120.8 | 2.4 | 18.0 | 20.4 | 14.8 | 8.5 |
| 43 | 44.9 | 7% FORAL | 310 | 104.5 | 2.7 | 19.0 | 18.2 | 10.0 | 6.0 |
| 44 | 41.1 | neat | 488 | 112.7 | 3.0 | 19.3 | 20.8 | 16.4 | 7.5 |
| 45 | 41.1 | 7% KRYST | 465 | 109.5 | 1.9 | 18.3 | 20.9 | 15.8 | 6.0 |
| 46 | 41.1 | 7% FORAL | 385 | 105.6 | 2.1 | 19.7 | 20.8 | 12.1 | 7.0 |
| 47 | 42.1 | neat | 543 | 110.3 | 3.0 | 19.9 | 19.5 | 15.8 | 10.0 |
| 48 | 42.1 | 7% KRYST | 510 | 112.3 | 2.1 | 20.4 | 21.8 | 18.1 | 1.8 |
| 49 | 42.1 | 7% FORAL | 425 | 111.8 | 2.3 | 14.8 | 17.7 | 16.5 | 2.0 |
| 50 | 46.6 | neat | 533 | 123.1 | 4.3 | 15.9 | 14.1 | 10.1 | 8.0 |
| 51 | 46.6 | 7% KRYST | 470 | 120.8 | 2.9 | 19.2 | 19.0 | 16.9 | 17.5 |
| 52 | 46.6 | 7% FORAL | 385 | 113.9 | 3.0 | 18.7 | 18.5 | 17.6 | 8.0 |
| C24 | 49.1 | neat | 888 | 133.6 | 4.4 | 18.9 | 9.4 | 8.8 | 8.0 |
| C25 | 49.1 | 7% KRYST | 743 | 126.4 | 2.9 | 20.9 | 16.0 | 15.2 | 7.5 |
| C26 | 49.1 | 7% FORAL | 563 | 128.7 | 3.4 | 19.3 | 21.2 | 18.7 | 8.5 |

We claim:

1. A hot-melt, adhesive composition, comprising:
A. about 50 to 100 weight percent, based on the total weight of said adhesive composition, of at least one polyester, comprising (i) diacid residues, comprising about 70 to 100 mole percent, based on the total moles of diacid residues, of the residues of 1,4-cyclohexanedicarboxylic acid, and 0 to about 30 mole percent of the residues of at least one modifying dicarboxylic acid having about 4 to about 40 carbon atoms; and (ii) diol residues, comprising about 70 to about 100 mole percent, based on the total moles of diol residues, of the residues of at least two diols chosen from 1,4-cyclohexanedimethanol, triethylene glycol, and diethylene glycol; and about 30 to about 0 mole percent of the residues of at least one modifying diol; and
B. 0 to about 50 weight percent of a tackifier, plasticizer, wax, nucleator, or combination thereof;
wherein said polyester has an inherent viscosity of about 0.1 to about 0.4 dL/g as measured at 25° C. using 0.5 grams of polymer per 100 ml of a solvent comprising 60 weight percent phenol and 40 weight % tetrachloroethane, a melting temperature of about 80 to about 130° C., and a heat of melting of about 0.1 cal/g to about 6 cal/g; and
wherein said adhesive composition has a melt viscosity of about 300 to about 3000 centipoise at 150° C.

2. The adhesive composition according to claim 1, wherein said modifying dicarboxylic acid comprises succinic acid, glutaric acid, adipic acid, suberic acid, pimelic acid, fumaric acid, maleic acid, itaconic acid, glycolic acid sebacic acid, azelaic acid, dimer acid, terephthalic acid, isophthalic acid, or combinations thereof; and said modifying diol comprises ethylene glycol, 1,2-propanediol, 1,3-propanediol, 1,5-pentanediol, neopentyl glycol, 1,6-hexanediol, 1,8-octanediol, 2,2,4-trimethyl-1,3-pentanediol, polyethylene glycol, polytetramethylene glycol, polypropylene glycol, 2,4-dimethyl-2-ethylhexane-1,3-diol; 2,2,4,4-tetramethyl-1,3-cyclobutanediol, 2,2-dimethyl-1,3-propanediol, 2-ethyl-2-butyl-1,3-propanediol, 2-ethyl-2-isobutyl-1,3-propanediol, 1,3-butanediol, 1,5-pentanediol, or combinations thereof.

3. The adhesive composition according to claim 2, wherein said diacid residues comprise about 80 to about 100 mole percent of the residues of 1,4-cyclohexanedicarboxylic acid, and 0 to about 20 mole percent of the residues of said modifying dicarboxylic acid; and said diol residues comprise about 30 to about 65 mole percent of the residues of 1,4-cyclohexanedimethanol; about 20 to about 65 mole percent of the residues of triethylene glycol, diethylene glycol, or a combination thereof; and about 0 to about 30 mole percent of the residues of polypropylene glycol.

4. The adhesive composition according to claim 3, wherein said modifying dicarboxylic acid comprises adipic acid, glutaric acid, dimer acid, or combinations thereof.

5. The adhesive composition according to claim 1, wherein said diol residues comprise about 35 to about 65 mole percent of the residues of triethylene glycol and about 20 to about 60 mole percent of the residues of diethylene glycol.

6. The adhesive composition according to claim 3, wherein said diacid residues comprise about 90 to about 95 mole percent of the residues of 1,4-cyclohexanedicarboxylic acid and about 5 to about 10 mole percent of the residues of dimer acid; and said diol residues comprise about 40 to about 60 mole percent of the residues of 1,4-cyclohexanedimethanol, about 60 to about 40 mole percent of the residues of triethylene glycol, diethylene glycol, or a combination thereof; and 0 to about 20 mole percent of the residues of polypropylene glycol.

7. The adhesive composition according to claim 1, wherein said tackifier comprises a tall oil rosin, gum rosin, wood rosin, hydrogenated rosin, polymerized rosin, disproportionated rosin, aromatic hydrocarbon resin, coumarone-indene resin, polyterpene, terpene-phenolic resin, phenolic resin, maleic resin, ketone resin, polyester resin, or combinations thereof; said plasticizer comprises a benzoate ester, phthalate ester, citrate ester, phosphate ester, terephthalate ester, isophthalate ester, or combinations thereof; said wax comprises stearamide, 12-hydroxystearamide, N-(2-hydroxy ethyl)-12-hydroxystearamide, glycerin monostearate, sorbitan monostearate, 12-hydroxy stearic acid, or combinations thereof; and said nucleator comprises a polyolefin or olefinic ionomer having a melting temperature of about 70 to about 130° C., or a combination thereof.

8. The adhesive composition according to claim 7, wherein said tackifier comprises said hydrogenated rosin, wherein said hydrogenated rosin has an acid number of about 145 to about 175 mg KOH/gram of rosin; said plasticizer comprises said benzoate ester comprising 1,4-cyclohexanedimethanol dibenzoate, neopentyl glycol dibenzoate, dipropylene glycol dibenzoate, propylene glycol dibenzoate, isodecyl benzoate, alkyl benzoate esters having 7 to 40 carbon atoms, or combinations thereof; and said nucleator comprises said polyolefin comprising polyethylene or polypropylene, said olefinic ionomer, or combinations thereof.

9. The adhesive composition according to claim 7, which comprises about 50 to about 70 weight percent of said polyester, about 20 to about 40 weight percent of said hydrogenated rosin, and about 5 to about 15 weight percent of said plasticizer comprising 1,4-cyclohexane-dimethanol dibenzoate; said wax comprising stearamide, 12-hydroxystearamide, N-(2-hydroxy ethyl)-12-hydroxystearamide or a combination thereof; or a combination of said plasticizer and said wax.

10. The adhesive composition according to claim 1, wherein said polyester has a heat of melting of about 0.1 to about 4 cal/g.

11. A hot-melt adhesive composition, comprising:
A. about 90 to 100 weight percent, based on the total weight of said adhesive composition, of at least one polyester, comprising (i) diacid residues, comprising about 80 to 100 mole percent, based on the total moles of diacid residues, of the residues of 1,4-cyclohexanedicarboxylic acid, and 0 to about 20 mole percent of the residues of adipic acid, dimer acid, or a mixture thereof; and (ii) diol residues, comprising about 40 to about 60 mole percent, based on the total moles of diol residues, of the residues of 1,4-cyclohexane-dimethanol and about 60 to about 40 mole percent of the residues of triethylene glycol, diethylene glycol, or a mixture thereof; and
B. 0 to about 5 weight percent of at least one nucleator;
wherein said polyester has an inherent viscosity of about 0.1 to about 0.3 dL/g as measured at 25° C. using 0.5 grams of polymer per 100 ml of a solvent comprising 60 weight percent phenol and 40 weight % tetrachloroethane, a melting temperature of about 80 to about 120° C., and a heat of melting of about 0.1 cal/g to about 4 cal/g; and
wherein said adhesive composition has a melt viscosity of about 300 to about 3000 centipoise at 150° C.

12. The adhesive composition according to claim 11, which comprises about 0.1 to about 5 weight percent of said nucleator, wherein said nucleator comprises a polyolefin, olefinic ionomer, or a combination thereof.

* * * * *